US012250297B1

(12) United States Patent
Falk et al.

(10) Patent No.: US 12,250,297 B1
(45) Date of Patent: Mar. 11, 2025

(54) APPARATUS AND METHOD FOR SECURE MERGING OF LISTS USING ONLY LOCAL COMPUTATIONS AT EACH OF TWO MACHINES AND COMMUNICATIONS SOLELY BETWEEN THE TWO MACHINES

(71) Applicant: Stealth Software Technologies, Inc., Los Angeles, CA (US)

(72) Inventors: Brett Hemenway Falk, Philadelphia, PA (US); Rafail Ostrovsky, Santa Monica, CA (US); Rohit Nema, Los Angeles, CA (US)

(73) Assignee: Stealth Software Technologies, Inc., Los Angeles, CA (US)

( * ) Notice: Subject to any disclaimer, the term of this patent is extended or adjusted under 35 U.S.C. 154(b) by 0 days.

(21) Appl. No.: 17/325,770

(22) Filed: May 20, 2021

Related U.S. Application Data

(60) Provisional application No. 63/027,714, filed on May 20, 2020.

(51) Int. Cl.
*H04L 9/08* (2006.01)
*H04L 9/00* (2022.01)
(Continued)

(52) U.S. Cl.
CPC .............. *H04L 9/085* (2013.01); *H04L 9/008* (2013.01); *H04L 9/0631* (2013.01); *H04L 9/30* (2013.01)

(58) Field of Classification Search
None
See application file for complete search history.

(56) References Cited

U.S. PATENT DOCUMENTS

| 9,641,332 B1 * | 5/2017 | Yung ......................... H04L 9/30 |
| 10,878,108 B1 * | 12/2020 | Nicolas ................. H04L 9/0643 |
| 2022/0382885 A1 * | 12/2022 | Durham .............. G06F 12/0646 |

FOREIGN PATENT DOCUMENTS

WO    WO-2019204711 A1 * 10/2019 ........... G06F 21/602

OTHER PUBLICATIONS

Yan Huang, David Evans, and Jonathan Katz; "Private Set Intersection: Are Garbled Circuits Better than Custom Protocols?" 2012; https://www.cs.virginia.edu/~evans/pubs/ndss2012/ (Year: 2012).*

(Continued)

*Primary Examiner* — Saleh Najjar
*Assistant Examiner* — Shadi H Kobrosli
(74) *Attorney, Agent, or Firm* — Cooley LLP

(57) ABSTRACT

Non-transitory computer readable storage mediums have instructions executed by processors to convert a first list at a first server into a first encrypted, permuted list with first dummy data elements and form a first encrypted linked list of pointers to locations in the first encrypted, permuted list. A second list at a second server is converted into a second encrypted, permuted list with second dummy data elements and a second encrypted linked list is formed of pointers to locations in the second encrypted, permuted list. Elements of the first encrypted, permuted list are combined with elements of the second encrypted, permuted list into a merged, sorted list of secret sharings, where the merged, sorted list of secret sharings is formed solely utilizing local computations at the first server, local computations at the second server and communications solely between the first server and the second server.

17 Claims, 7 Drawing Sheets

(51) Int. Cl.
*H04L 9/06* (2006.01)
*H04L 9/30* (2006.01)

(56) References Cited

OTHER PUBLICATIONS

Michael Zohner; Faster Oblivious Transfer Extension and Its Impact on Secure Computation; 2016; https://d-nb.info/113125421X/34 (Year: 2016).*

Yan Huang; Practical Secure Two-Party Computation; 2012; https://citeseerx.ist.psu.edu/viewdoc/download?doi=10.1.1.697.1660&rep=rep1&type=pdf (Year: 2012).*

Muhammad Basit Khurram; SFour: A Protocol for Cryptographically Secure Record Linkage at Scale; 2019; https://uwspace.uwaterloo.ca/bitstream/handle/10012/15123/Khurram_MuhammadBasit.pdf?sequence=3&isAllowed=y (Year: 2019).*

M. S. Riazi, M. Javaheripi, S. U. Hussain and F. Koushanfar, "MPCircuits: Optimized Circuit Generation for Secure Multi-Party Computation," 2019 IEEE International Symposium on Hardware Oriented Security and Trust (HOST), McLean, VA, USA, 2019, pp. 198-207, doi: 10.1109/HST.2019.8740831. (Year: 2019).*

Benny Pinkas, Thomas Schneider, and Michael Zohner. 2018. Scalable Private Set Intersection Based on OT Extension. ACM Trans. Priv. Secur. 21, 2, Article 7 (May 2018), 35 pages. https://doi.org/10.1145/3154794 (Year: 2018).*

T-H. Hubert Chan and Jonathan Katz and Kartik Nayak and Antigoni Polychroniadou and Elaine Shi "More is Less: Perfectly Secure Oblivious Algorithms in the Multi-Server Setting" CoRR (Year: 2018).*

Dov Gordon, S., Katz, J., & Wang, X. (2018). Simple and efficient two-server ORAM. In T. Peyrin, & S. Galbraith (Eds.), Advances in Cryptology—ASIACRYPT 2018 (Year: 2018).*

* cited by examiner

APPARATUS AND METHOD FOR SECURE MERGING OF LISTS USING ONLY LOCAL COMPUTATIONS AT EACH OF TWO MACHINES AND COMMUNICATIONS SOLELY BETWEEN THE TWO MACHINES

CROSS-REFERENCE TO RELATED APPLICATION

This application claims priority to U.S. Provisional Patent Application Ser. No. 63/027,714, filed May 20, 2020, the contents of which are incorporated herein by reference.

FIELD OF THE INVENTION

This application relates generally to sharing information in computer networks. More particularly, this invention is directed toward techniques for secure merging of lists using only local computation at each of two machines and communications solely between the two machines.

BACKGROUND OF THE INVENTION

Merging two sorted lists of data elements into a single, globally sorted list is a frequently used operation in database processing and data analytics applications. In contexts in which two mutually untrusting parties each control a separate database storing sensitive data, the parties may wish to obtain the results of aggregate computations on their combined data without either party revealing to the other any additional information about its underlying sensitive data. For such privacy-preserving collaborative computation, it is accordingly desirable to be able to securely merge two sorted lists, each at one of two servers, into a globally sorted list of secret sharings of data elements in a data-oblivious manner. Moreover, particularly for applications with large amounts of data, it is desirable to be able to perform such secure merging efficiently at scale.

Currently existing solutions for secure merging with linear asymptotic time and communication complexity require the use of more than two servers, as well as a trusted client computer, to merge two lists; such a requirement can present practical impediments to implementation in settings where only two parties seek to securely perform computations on their combined data. Additionally, a significant obstacle to efficient two-party secure computation using encrypted data is the high computation and communication cost of securely evaluating decryption circuits using general-purpose secure multiparty computation protocols.

It is against this background that a need arose to develop the techniques described herein.

SUMMARY OF THE INVENTION

Non-transitory computer readable storage mediums have instructions executed by processors to convert a first list at a first server into a first encrypted, permuted list with first dummy data elements and form a first encrypted linked list of pointers to locations in the first encrypted, permuted list. A second list at a second server is converted into a second encrypted, permuted list with second dummy data elements and a second encrypted linked list is formed of pointers to locations in the second encrypted, permuted list. Elements of the first encrypted, permuted list are combined with elements of the second encrypted, permuted list into a merged, sorted list of secret sharings, where the merged, sorted list of secret sharings is formed solely utilizing local computations at the first server, local computations at the second server and communications solely between the first server and the second server.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Disclosed are techniques to perform efficient secure merging of sorted lists into a list of secret sharings using only local computations at each of two servers and communication solely between those two servers, without resorting to using secure multiparty computation protocols for evaluation of decryption circuits. Reference to "communication solely between those two servers" means meaningful computations coordinated between the two servers; it does not contemplate the simple passing of information in a computer network between machines disposed between the two servers.

Since the disclosed techniques do not entail utilization of a third machine in a secure multiparty computation protocol (i.e., three or more machines), each of the two utilized machines has improved function since it is not communicating with an additional machine. Moreover, there is reduced network bandwidth since data is only exchanged between two machines, not an additional machine. These reduced network communications improve network security by frustrating attacks between multiparty networked machines.

Figure 1:
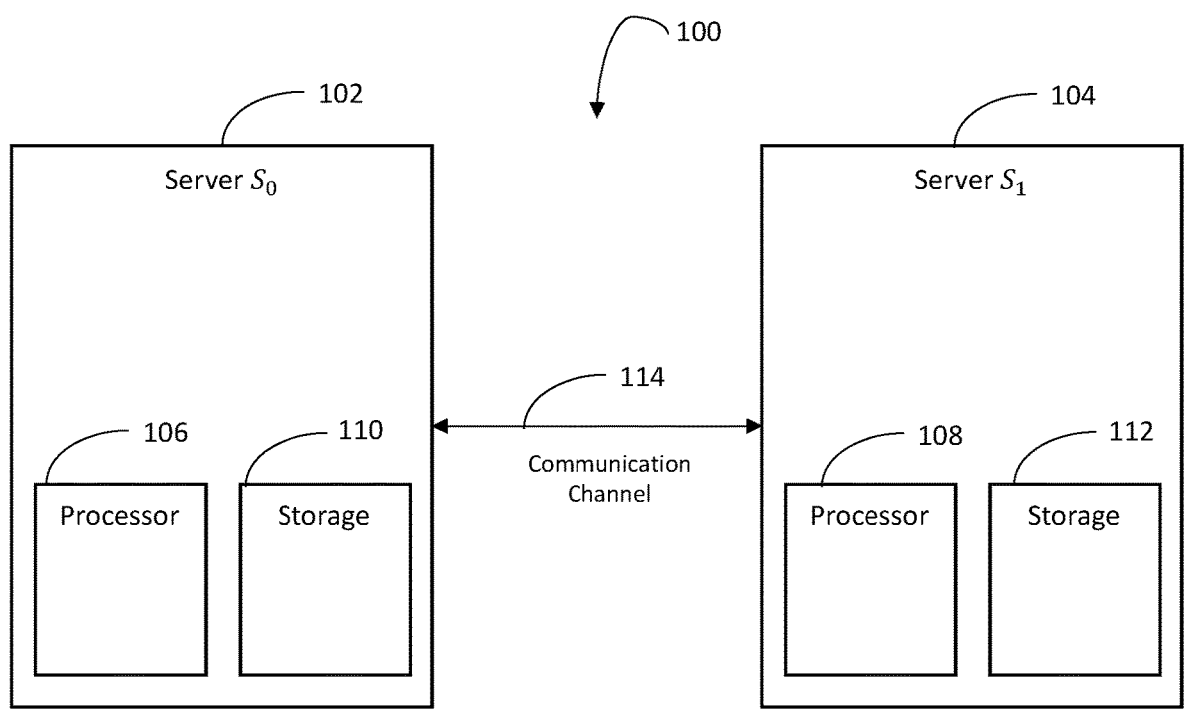
FIG. 1 illustrates a system for two servers storing data elements to jointly and securely perform operations on data elements or lists of data elements, in accordance with an embodiment of the present invention.

FIG. 1 illustrates a system 100 for two servers storing data elements to jointly perform operations on individual data elements or lists of data elements, without leaking information about the underlying data elements or the access patterns thereof. The system 100 includes a communication channel 114 connecting two servers 102 and 104. The communication channel 114 may represent a network, such as a packet-switched network (such as the Internet) or a circuit-switched network, or any other communication channel over which electronic data may be transmitted. Each server 102 and 104 includes storage or memory 110 and 112 and a processor 106 and 108. The memory 110 and 112 for each server 102 and 104 each comprise one or more forms of electronic data storage or combinations thereof, including hard disk storage, solid-state drive storage, random access memory (RAM), or other forms of computer-readable electronic data storage. The data storage 110 and 112 may each reside in one computing device or may be distributed across multiple computing devices. The processors 106 and 108 for each server 102 and 104 each comprise one or more computer processors, which may reside in one computing device or may be distributed across multiple connected computing devices. The storage 110 and 112 for each server 102 and 104 each store a set of executable programs that may be used by the processors 104 and 108, respectively, to execute process steps described for embodiments of the present invention. In particular, each memory 110 and 112 stores executable programs that may be used by the processors 104 and 108 to execute encryption and decryption under a public-key homomorphic cryptosystem, processing on secret shares under a (2,2)-threshold secure secret sharing scheme, secure multiparty computation multiplex primitives, secure multiparty computation comparison primitives, and secure multiparty computation equality testing primitives. The properties of such cryptosystems, secret sharing schemes, and secure multiparty computation primitives will be described in greater detail below.

The use of the terminology of "server" for each server 102 and 104 is non-limiting with respect to the types of memory 110 and 112 and processors 106 and 108 that may be used in embodiments of the invention, and is non-limiting with respect to the types of computing devices that each server 102 and 104 may comprise in embodiments of the invention. In embodiments of the invention, the two servers 102 and 104 may reside in separate computing devices or groups of computing devices connected by the communication channel 114, or they may reside in a single computing device containing the communication channel 114.

In embodiments of the present invention, each server 102 and 104 will store one or more data elements in the storage 110 and 112. The present invention is non-limiting with respect to the data types, data structures, or bit representations under which such data elements may be stored in memory according to an embodiment of the invention. However, for purposes of describing the performance advantages of embodiments of the invention, specifically for purposes of describing the time, space, or communication complexity of processes executed according to embodiments of the invention, it will be assumed that each such data element can be stored in memory using at most a fixed number of bits. This number of bits may vary between different embodiments of the invention but must be fixed for any given embodiment of the invention. In certain embodiments of the present invention, either or both of the servers 102 and 104 will also store one or more lists of such data elements. The present invention is non-limiting with respect to the data types, data structures, or bit representations under which such lists may be stored in memory according to an embodiment of the invention. In subsequent descriptions of embodiments of the invention, the "length" of such a list is the number of data elements in the list.

Figure 2:
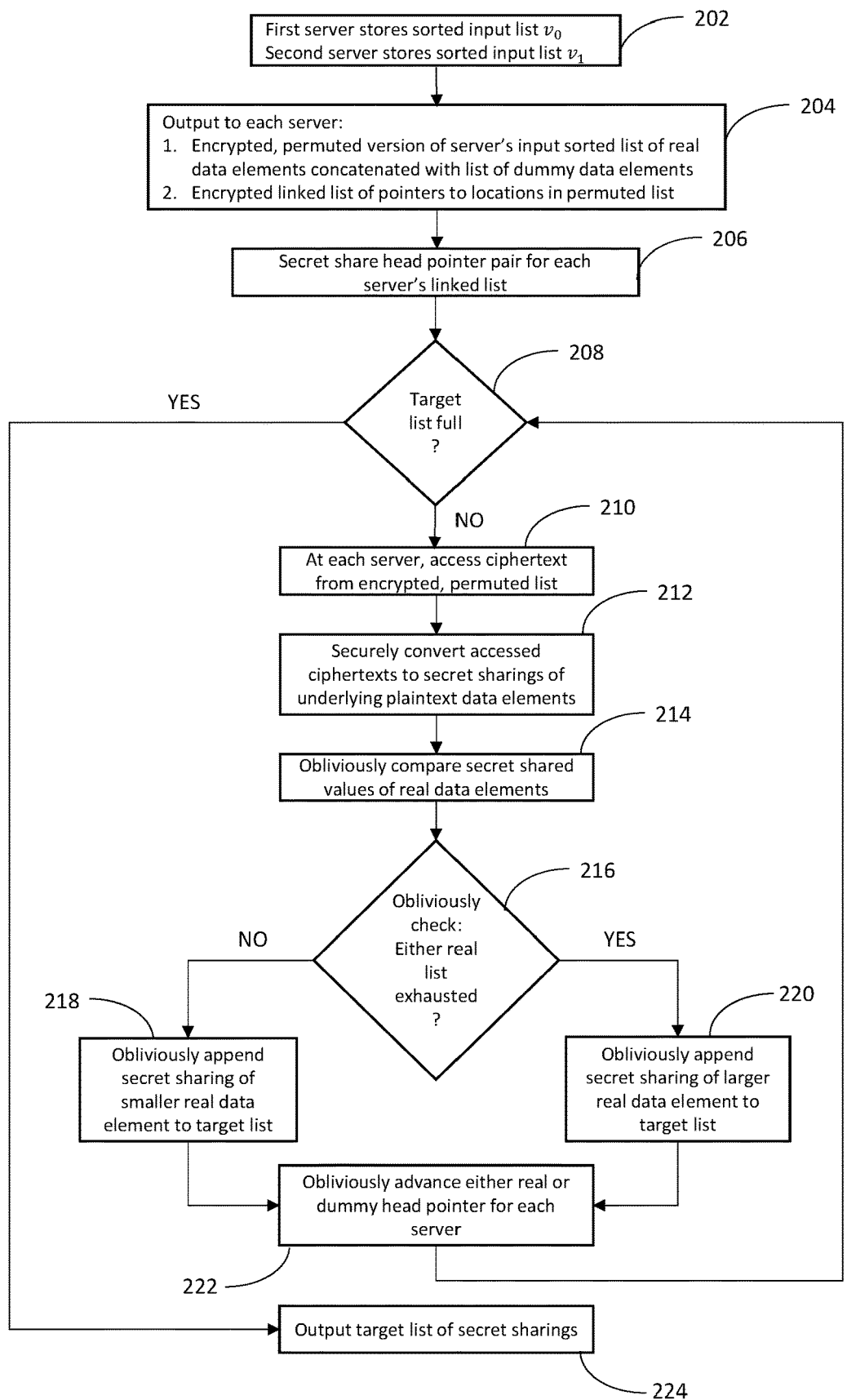
FIG. 2 is a diagram of a protocol for two servers, each storing a sorted list, to securely merge their lists into a single sorted list of secret sharings of the underlying data elements, in accordance with an embodiment of the present invention.

FIG. 2 is a protocol according to an embodiment of the present invention, for two servers 102 and 104, each storing a sorted input list of data elements, to merge their lists into a single, globally sorted list of secret sharings, under a (2,2)-threshold secret sharing scheme, of the underlying data elements, without leaking to either server information about the other server's input list aside from its length.

It should be noted that all secret sharing schemes referred to here and in subsequent descriptions of embodiments of the present invention are (2,2)-threshold secret sharing schemes and are assumed to satisfy the following property with respect to a group operation on plaintext data elements: given secret sharings of any two plaintext data elements x and y, each server can compute its share of a secret sharing of the composition of x and y under the group operation by using only local computations on its secret share of x and its secret share of y, that is, without communicating with the other server. For example, in one embodiment of the invention, the secret sharing scheme may be an additive secret sharing scheme. In another embodiment, the secret sharing scheme may be a linear secret sharing scheme. The group operation referred to in this paragraph may vary between descriptions of secret sharing schemes as applied in embodiments of the present invention.

In an embodiment of the invention, at the beginning of the protocol at block 202, each of the two servers stores a sorted list of data elements as input to the protocol. Specifically, each such list is sorted with respect to a fixed ordering on data elements, such that any data element from either of the lists can be compared with any other such data element with respect to the ordering. In subsequent descriptions of embodiments of the invention, unless otherwise specified, size-related terms applied to data elements, including "smaller," "larger," "smallest," and "largest," are used with respect to this ordering.

In an embodiment of the invention, at block 204, the two servers jointly execute a protocol that outputs to each of the servers 102 and 104 an encrypted, permuted version of that server's input sorted list concatenated with a list of dummy data elements and an encrypted linked list of pointers to locations in the encrypted, permuted list. More specifically, the jointly executed protocol outputs two lists of data elements to each server, as follows.

For a given server, the first list output to that server is equivalent to a list obtained by concatenating that server's sorted input list with another list containing dummy data elements, applying a permutation to the resulting concatenated list, and encrypting the resulting permuted list element-by-element using the public key of the other server under a homomorphic cryptosystem. In the subsequent description of FIG. 2, this first list output to a given server at block 204 will be referred to as that server's encrypted, permuted list. The terminology of "dummy" data elements is used here and in subsequent descriptions of embodiments of the invention to distinguish such data elements from the data elements of the given server's sorted input list, which will be referred to as that server's "real" data elements. The list of dummy data elements with which the given server's input list is concatenated is not assumed to be sorted; however, it is required that each dummy data element be able to be compared with any of either of the two server's real data elements with respect to the fixed ordering on data elements. Additionally, the list of dummy data elements with which the given server's input list is concatenated has the same length as the other server's input sorted list.

The second list output to a given server at block 204 is an element-by-element encryption, using the public key of the other server under a homomorphic cryptosystem, of a linked list of pointers to locations in the first encrypted, permuted list output to that server at block 204. The underlying linked list for a given server has the same length as that server's encrypted, permuted list. For each location in the encrypted, permuted list that holds a ciphertext encrypting a real data element other than the last data element in the given server's sorted input list, the pointer at the corresponding location in the linked list gives the location in the encrypted, permuted list that holds the ciphertext encrypting the next data element in the server's sorted input list. For the location in the encrypted, permuted list that holds the ciphertext encrypting the last data element in the given server's sorted input list, the pointer at the corresponding location in the linked list gives the location in the encrypted, permuted list of a ciphertext encrypting a dummy data element whose value is equal to that of the last data element in the given server's sorted input list. For each location in the encrypted, permuted list that holds a ciphertext encrypting a dummy data element, the corresponding pointer in the linked list gives the location in the encrypted, permuted list of a ciphertext encrypting another dummy data element, and no two distinct such locations corresponding to dummy data elements in the encrypted, permuted list are pointed to the same location.

In an embodiment of the invention, the underlying linked list for each server is equipped with a head pointer pair, which is secret shared between the two servers at block 206. The head pointer pair for a given server contains a real head pointer, which is initialized to the location in that server's encrypted, permuted list of the ciphertext encrypting the first data element of that server's input sorted list, and a dummy head pointer, which is initialized to the location in that server's encrypted, permuted list of the ciphertext encrypting the first data element of the list of dummy data elements with which that server's sorted input list was concatenated.

Figure 3:
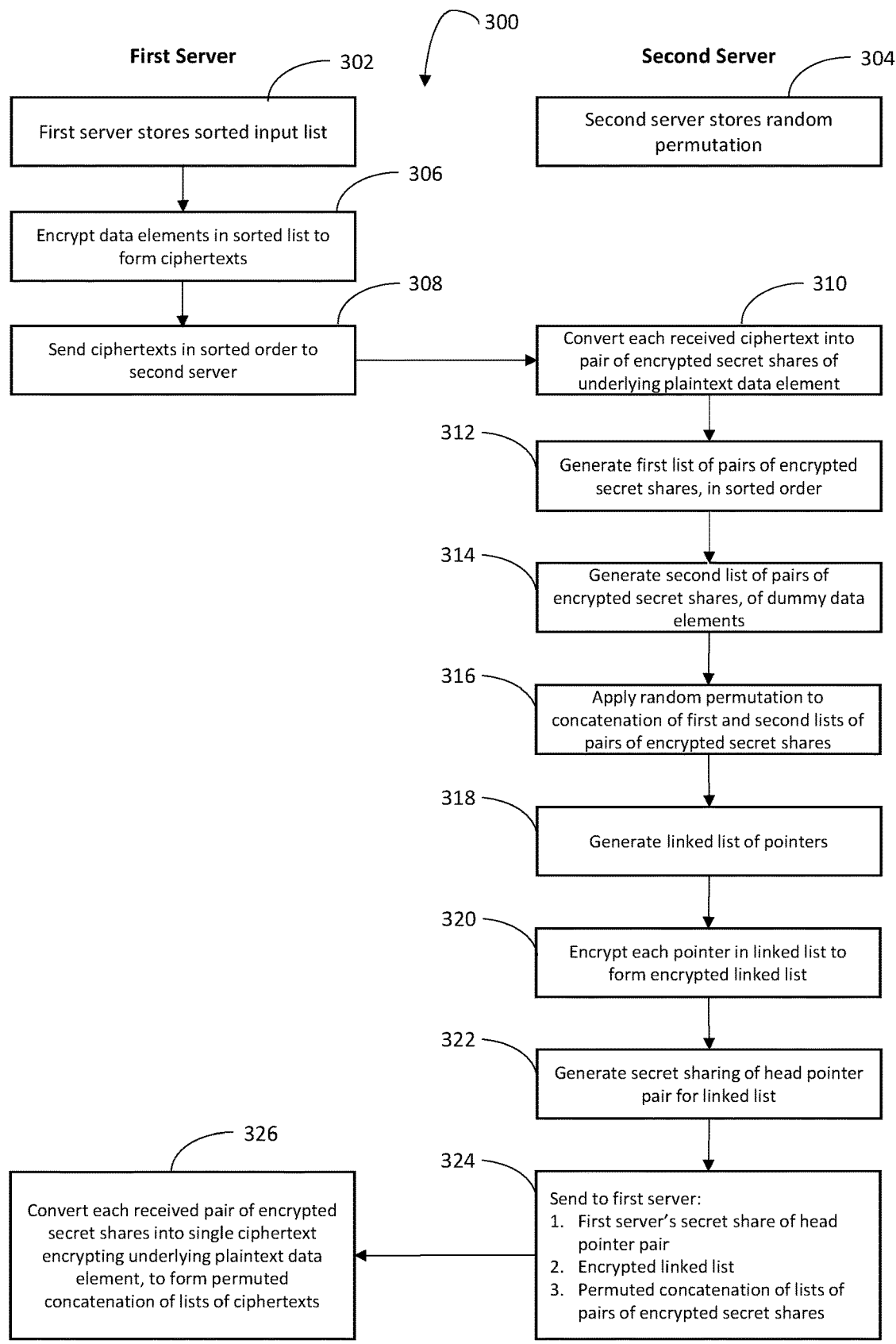
FIG. 3 is a diagram of a protocol for two servers to convert a sorted list stored at one of the servers into an encrypted, permuted list with encrypted dummy data elements and to form an encrypted linked list of pointers that can be used to traverse the encrypted, permuted list, in accordance with an embodiment of the present invention.

In certain embodiments of the invention, the protocol jointly executed by the two servers to output to each server an encrypted, permuted list and an encrypted linked list, at block 204, and the secret sharing of the head pointers, at block 206, may comprise two applications, one with each of the servers playing the role of the "first server" and the other playing the role of the "second server," of a protocol 300 depicted in FIG. 3. It should be noted that, in such applications of a protocol 300, the padding parameter described below in the description of FIG. 3 will be equal to the length of the second server's sorted input list stored at block 202.

Blocks 208-222 in FIG. 2 depict an iterative procedure jointly executed by the two servers, at each iteration of which encrypted real data elements from each server's encrypted, permuted list are obliviously compared with respect to the fixed ordering on data elements; a secret sharing of a real data element of one of the two servers is obliviously appended to a target list; and either the real or the dummy head pointer for each server's linked list is obliviously advanced, as follows.

At block 208 the two servers check whether a target list, which is initialized to an empty list and will be populated with secret sharings of data elements from the servers' input sorted lists in globally sorted order is full. More specifically, at block 208 the servers check whether the target list has length equal to the sum of the lengths of the servers' input sorted lists. In an embodiment of the invention, this target list is distributed between the two servers, with each server locally storing a list containing its shares of the described secret sharings of data elements at corresponding locations, and at block 208 each server locally checks the length of its locally stored share of the target list.

In an embodiment of the invention, at every iteration before the target list is full, at block 210 each of the two servers accesses a ciphertext from its encrypted, permuted list as indicated by the secret shared head pointer pair for its linked list. More specifically, at the first iteration each server accesses the ciphertext at the location indicated by its real head pointer; at subsequent iterations, each server accesses the ciphertext at the location indicated by either its real or its dummy head pointer, whichever was advanced obliviously at block 222 during the previous iteration, as will be described below. In certain embodiments of the invention, the servers maintain a secret sharing of a data element b comprising at least one bit that encodes, for each server, whether a ciphertext is to be accessed according to the server's real head pointer or its dummy head pointer at the current iteration; this secret shared data element b will be further referred to in subsequent descriptions below of other blocks in FIG. 2. It should be noted that, as described below, the secret shared data element b will also encode, for each server, whether the server's real or dummy head pointer will be advanced obliviously at block 222 during a given iteration; at block 210, the data element b will encode that a given server is to access the ciphertext at the location in its encrypted, permuted list indicated by either its real or its dummy head pointer, whichever was advanced obliviously at block 222 during the previous iteration. The servers jointly execute secure multiparty computation multiplex primitives using this secret shared data element b and each server's secret shared head pointer pair to output to each server the location in its encrypted, permuted list from a which a ciphertext is to be accessed, according to the appropriate head pointer encoded by b. It should be noted that the use of a secure multiparty computation multiplex primitive applied to secret sharings allows the protocol to output to each server an access location without revealing to either server whether the real or the dummy head pointer was used to determine the access location for a given server, and without leaking to either server information about which location in the other server's encrypted, permuted list is to be accessed.

In an embodiment of the invention, at block 212 the servers jointly and securely convert each of the ciphertexts accessed at block 210 during the current iteration into a secret sharing of the plaintext data element of which the respective ciphertext is an encryption, without executing a secure multiparty computation protocol to evaluate a decryption circuit. It should be noted that, although in theory it is possible to convert a ciphertext into a secret sharing of the underlying plaintext data element by using a general-purpose secure multiparty computation protocol to evaluate the decryption circuit for the cryptosystem under which the ciphertext is encrypted, such an approach cannot be accomplished with asymptotic time complexity linear in the sum of the servers' sorted input lists. Accordingly, in embodiments of the present invention, the servers do not use a secure multiparty computation protocol to evaluate any decryption circuit, and any decryption of a ciphertext is executed locally at one of the two servers using a secret key of that server.

Figure 5:
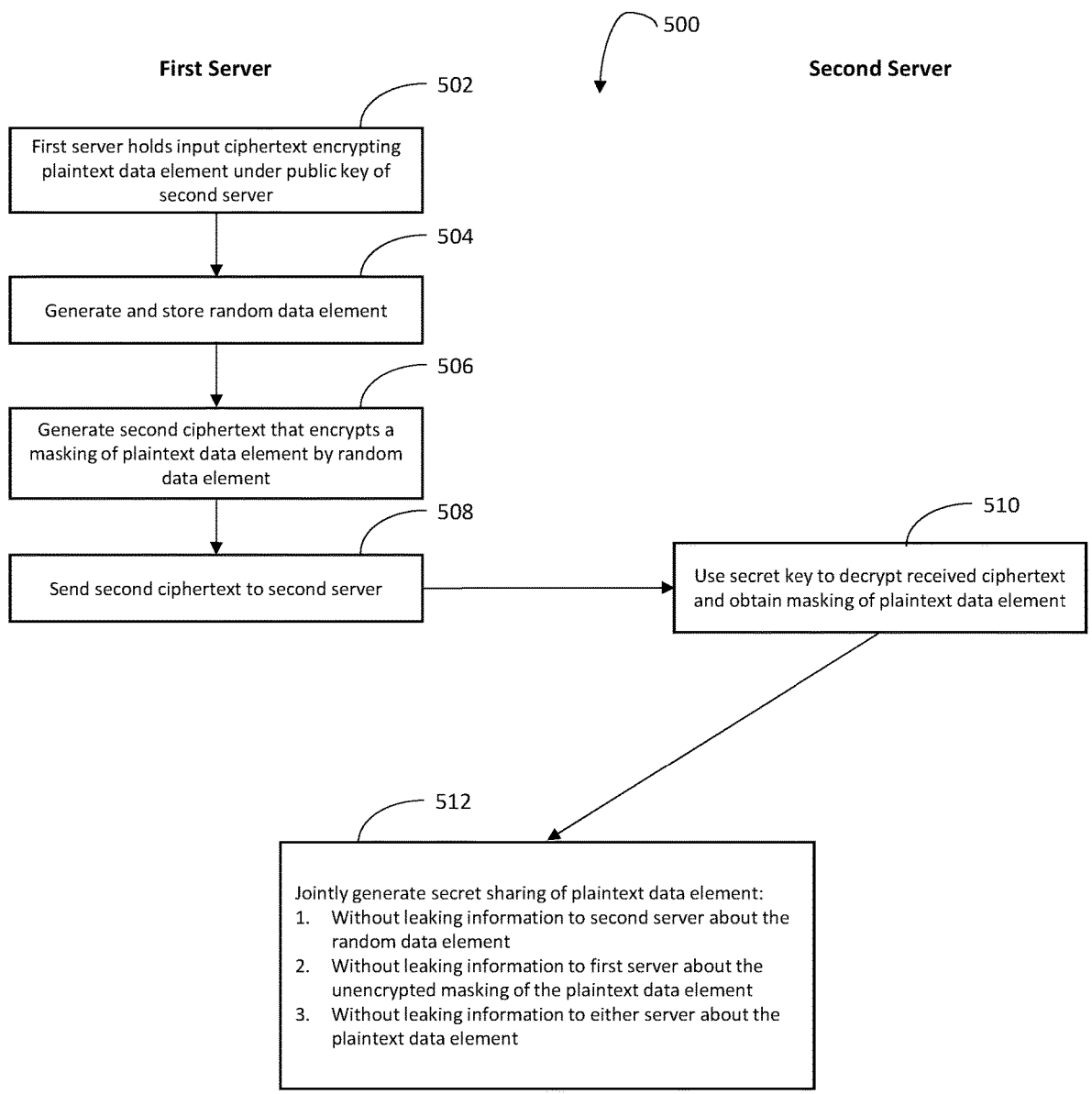
FIG. 5 is a diagram of a protocol for two servers to convert a ciphertext encrypting a plaintext data element into a secret sharing of the plaintext data element, according to an embodiment of the present invention.
Figure 6:
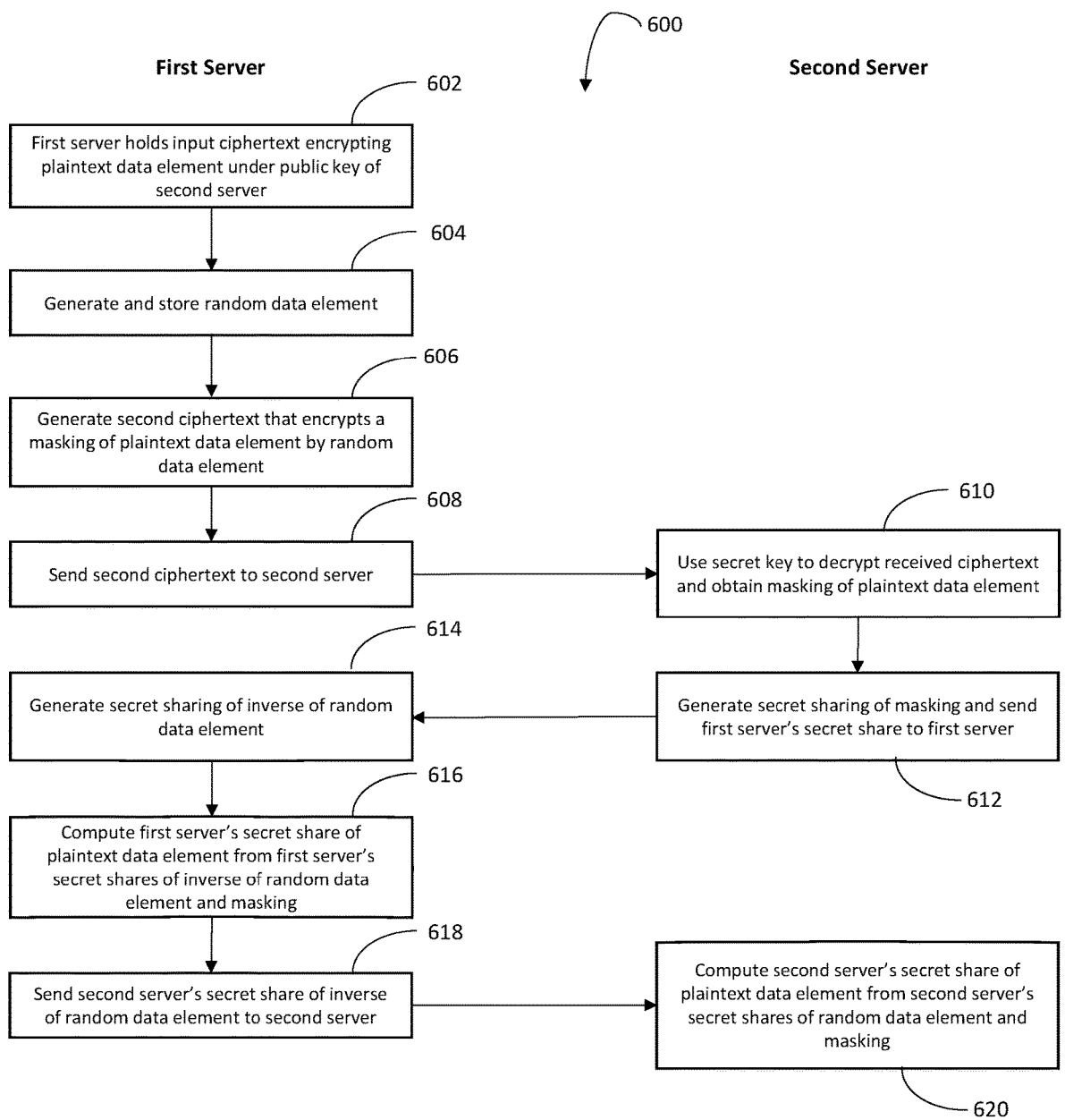
FIG. 6 is a diagram of a particular implementation of the protocol depicted in FIG. 5 for two servers to convert a ciphertext encrypting a plaintext data element into a secret sharing of the plaintext data element, according to an embodiment of the present invention.
Figure 7:
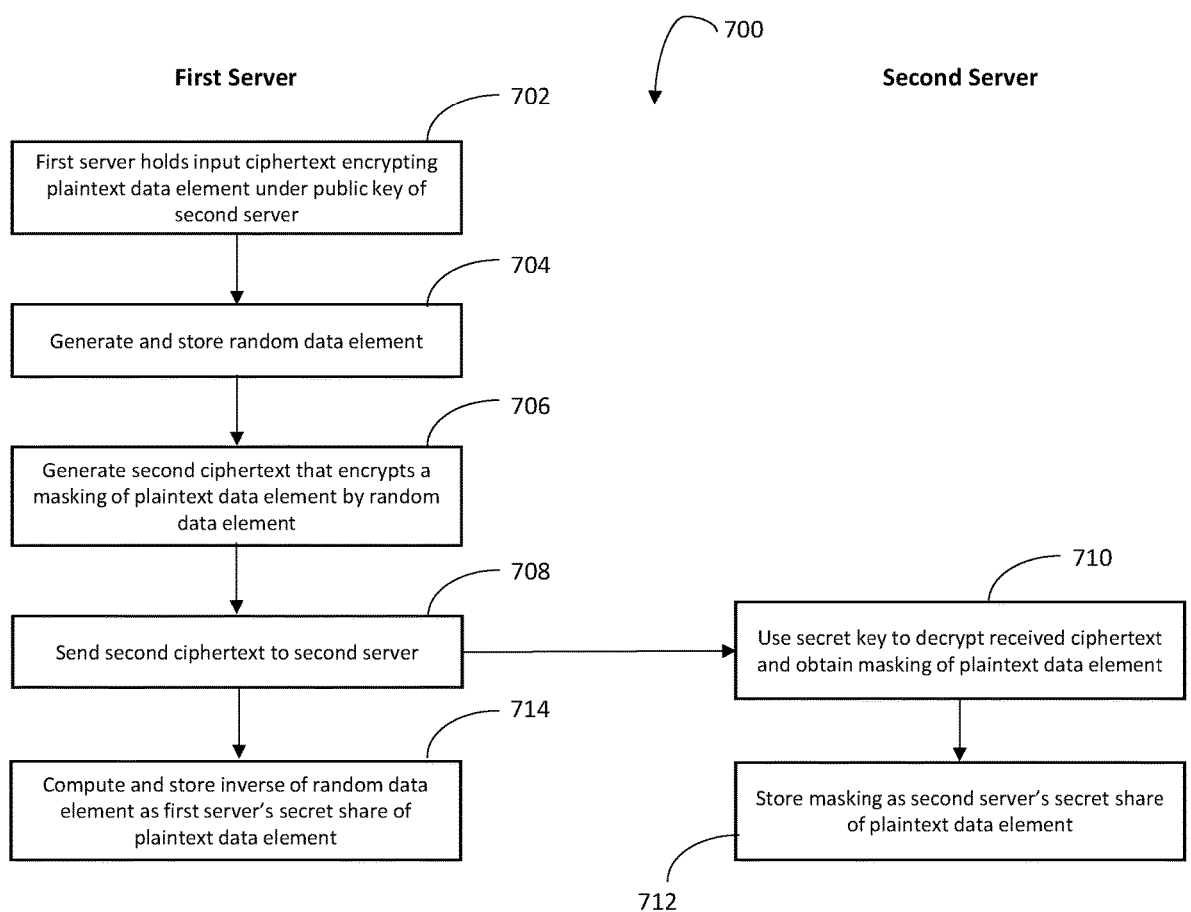
FIG. 7 is a diagram of a particular implementation of the protocol depicted in FIG. 5 for two servers to convert a ciphertext encrypting a plaintext data element into an additive secret sharing of the plaintext data element, according to an embodiment of the present invention.

FIG. 5, FIG. 6, and FIG. 7, which will be described further below, illustrate protocols used by the servers to accomplish the secure ciphertext-to-secret-sharing conversion displayed at block 212 according to particular embodiments of the invention. As used in this paragraph, the conversion of ciphertexts to secret sharings is secure in the sense that for each server, the distribution ensemble of the server's output secret shares over all input ciphertexts of a given bit length is computationally indistinguishable from a uniform distribution ensemble.

In an embodiment of the invention, at block 214 the servers jointly and obliviously compare two secret shared values of real data elements, one from each server's sorted input list. More specifically, the servers jointly execute a secure multiparty computation comparison primitive applied to secret sharings of one value for each server, as follows. If a given server has accessed a ciphertext from a location indicated by its real head pointer at block 210 during the current iteration, the secret shared value obtained from converting that ciphertext to a secret sharing at block 212 of the current iteration is used as that server's input to the secure multiparty computation comparison primitive. If a given server has accessed a ciphertext from a location indicated by its dummy head pointer at block 210 during the current iteration, the secret shared value that was used as that server's input to the secure multiparty computation comparison primitive at block 214 during the previous iteration is reused as that server's input to the primitive during the current iteration. In certain embodiments of the invention, the servers generate the secret shared input to the secure multiparty computation comparison primitive for each server by jointly executing a secure multiparty computation multiplex primitive using the secret shared data element b described above, the secret shared value obtained for that server at block 212 of the current iteration, and the secret shared value that was used as that server's input at block 214 during the previous iteration. The comparison of values of data elements at block 214 is oblivious in the sense that it leaks no information to either server about either of the values whose secret sharings are input to the comparison, and it leaks no information to either server about which server's value is the smaller (or whether the two values are equal).

In an embodiment of the invention, the secure multiparty computation comparison primitive jointly executed by the servers at block 214 outputs a secret sharing of a data element comprising at least one bit, which encodes the result of the comparison. In one embodiment of the invention, for example, the secret shared data element output by the comparison primitive at block 214 may consist of a single bit, which is equal to 0 if the value of the data element of server 102 whose secret sharing is input to the comparison primitive is smaller than the value of the data element of server 104 whose secret sharing is input to the comparison, and which is equal to 1 otherwise. It should be noted that, in such an embodiment of the invention, the output bit will be equal to 0 if the two values are equal. However, in general, the present invention is not limiting with respect to the output of the comparison primitive executed at block 214 in the case where the two compared values are equal. In subsequent descriptions of embodiments of the invention, executions of secure multiparty computation comparison primitives will be described as yielding a "smaller" and a "larger" data element; it should be understood that, in the case where the two compared values are equal, the manner in which one data element is assigned to be the "smaller" and the other the "larger" may vary according to different embodiments of the invention.

In an embodiment of the invention, at block 216 the servers jointly execute a protocol that obliviously checks whether either server's real data elements have been exhausted prior to the current iteration, that is, whether a secret sharing of every real data element from the sorted input list of one of the servers has already been appended to the target list during a previous iteration. More specifically, this checking is accomplished obliviously, in the sense that, at any given iteration, neither server can derive any information about whether either server's real data elements have been exhausted at any prior iteration. In certain embodiments of the invention, the servers maintain a secret sharing of a data element, which will be referred to as the "fin" data element, that encodes whether either server's real data elements have been exhausted at a prior iteration; the secret shared "fin" data element is obliviously updated once per iteration. In a preferred embodiment of the invention, the "fin" data element consists of a single bit.

In certain embodiments of the invention, the servers use the output of the secure multiparty computation comparison primitive executed at block 214 and the output of the oblivious checking protocol executed at block 216 to obliviously update the secret shared data element b described above. More specifically, if neither server's real data elements have been exhausted prior to the current iteration, the secret shared data element b is set to encode that, at block 222 of the current iteration, the real head pointer will be advanced for the server whose value was the smaller in the comparison at block 214, and the dummy head pointer will be advanced for the other server. If, according to the oblivious checking at block 216, either server's real data elements have been exhausted prior to the current iteration, the secret shared data element b is set to encode that, at block 222 of the current iteration, the real head pointer will be advanced for the server whose value was the larger in the comparison at block 214, and the dummy head pointer will be advanced for the other server. This updating of the secret shared data element b is oblivious, in the sense that no information is leaked to either server about whether b encodes that a given server's real or dummy head pointer is to be advanced at block 222 of the current iteration.

In an embodiment of invention, using the result of the oblivious checking at block 216, if neither server's real data elements have been exhausted prior to the current iteration, at block 218 the two servers jointly execute a protocol that obliviously appends to the target list the secret sharing of the smaller real data element according to the oblivious comparison at block 214 of the current iteration. If, according to the oblivious checking at block 216, either server's real data elements have been exhausted prior to the current iteration, at block 220 the two servers jointly execute a protocol that obliviously appends to the target list the secret sharing of the larger real data element according to the oblivious comparison at block 214 of the current iteration. In certain embodiments of the invention, the servers accomplish the oblivious appending, occurring at either block 218 or block 220 in a given iteration, by jointly executing a secure multiparty computation multiplex primitive using the secret shared data element b described above and the secret shared values of real data elements input to the oblivious comparison at block 214 of the current iteration. The appending of a secret sharing of a data element to the target list at either block 218 or block 220 is oblivious, in the sense that no information is leaked to either server about which server's sorted input list was the source of the data element whose secret sharing is appended to the target list, and no information is leaked to either server about the value of that data element.

In an embodiment of the invention, at block 222, the servers jointly execute a protocol to obliviously advance either the real head pointer or the dummy head pointer of each server to the next location according to the respective server's linked list. More specifically, the real head pointer is obliviously advanced for the server whose input list was the source of the secret sharing of a data element appended to the target list at either block 218 or block 220 of the current iteration, and the dummy head pointer of the other server is obliviously advanced. In certain embodiments of the invention, at block 222 the servers jointly execute, for each given server, a secure multiparty computation multiplex primitive using the data element b described above and the secret sharing of the given server's head pointer pair to reveal to the given server the location in its encrypted, permuted list indicated by either its real head pointer or its dummy head pointer, whichever is to be advanced. It should be noted that only the location in the encrypted, permuted list is revealed, and it is revealed only to the given server; in particular, no information is leaked to either server about whether the real head pointer or the dummy head pointer is to be advanced for either server. Each given server then extracts the ciphertext from the revealed location in its encrypted linked list, and the servers jointly and securely convert each such ciphertext into a secret sharing of the pointer from the linked list of which the ciphertext is an encryption, without executing a secure multiparty computation protocol to evaluate a decryption circuit. As described above, it should be noted that, although in theory it is possible to convert a ciphertext into a secret sharing of the underlying plaintext data element by using a general-purpose secure multiparty computation protocol to evaluate the decryption circuit for the cryptosystem under which the ciphertext is encrypted, such an approach cannot be accomplished with asymptotic time complexity linear in the sum of the servers' sorted input lists. Accordingly, in embodiments of the present invention, the servers do not use a secure multiparty computation protocol to evaluate any decryption circuit, and any decryption of a ciphertext is executed locally at one of the two servers using a secret key of that server.

FIG. 5, FIG. 6, and FIG. 7, which will be described further below, illustrate protocols used by the servers to accomplish such secure ciphertext-to-secret-sharing conversion according to particular embodiments of the invention. For each given server, the servers then jointly execute secure multiparty computation primitives using the secret shared data element b, the given server's secret shared pointer from its linked list, and the given server's secret shared real and dummy head pointers to replace the secret shared real or dummy head pointer, whichever is to be advanced, with the secret shared pointer from the linked list. The advancing of each server's real or dummy head pointer at block 222 is oblivious, in the sense that no information is leaked to either server about whether the real head pointer or the dummy head pointer is advanced for either server, and no information is leaked to either server about which location in the other server's encrypted, permuted list is accessed at any given iteration.

In an embodiment of the invention, after each server's real head pointer or dummy head pointer is obliviously advanced at block 222, the iterative procedure proceeds at block 208 to the next iteration if the target list is not full. If the target list is full, the iterative procedure stops, and the target list of secret sharings is output at block 224. It will be appreciated from the foregoing description of FIG. 2 that the output target list contains a secret sharing of each data element from each of the two servers' sorted input lists, arranged in sorted order of the underlying data elements with respect to the fixed ordering on data elements.

It will further be appreciated that, in an embodiment of the invention, the servers can execute the protocol depicted in FIG. 2 with each server performing a total number of secret sharings, encryptions, decryptions, secure multiparty computation multiplex primitives, secure multiparty computation comparison primitives, and secure multiparty computation equality testing primitives that is at most a constant multiple of the sum of the lengths of the servers' sorted input lists, where the constant multiple is independent of the lengths of the servers' sorted input lists.

FIG. 3 is a flow sheet diagram of a protocol 300, according to an embodiment of the present invention, for two servers 102 and 104, one of which stores a sorted input list of data elements, to output to that server an encrypted, permuted version of its sorted input list concatenated with a list of dummy data elements and an encrypted linked list of pointers that can be used to traverse the encrypted, permuted list in accordance with the original order of the sorted input list and the list of dummy data elements, without revealing to that server information about the permutation that was applied to the concatenated list and without revealing to the other server information about the sorted input list aside from its length. It should be noted that, in different applications in an embodiment of the invention, each server 102 and 104 may play the role of either the first server or the second server in the protocol 300 depicted in FIG. 3 and described below.

In an embodiment of the invention, at the beginning of the protocol 300, at block 302 the first server stores as input to the protocol a sorted list of data elements. The length of the first server's sorted input list will be denoted by n throughout this description of FIG. 3.

In an embodiment of the invention, at block 304 the second server stores a randomly generated permutation. More specifically, for some padding parameter m that may vary between applications of the protocol 300, the second server stores a randomly generated permutation on n+m elements.

In an embodiment of the invention, at block 306 the first server encrypts each data element from its sorted input list to form a ciphertext. More specifically, the first server encrypts each data element using the public key of the second server under a homomorphic cryptosystem. At block 308, the first server sends the ciphertexts generated at block 306 to the second server, in sorted order corresponding to the original sorted order of the underlying plaintext data elements.

In an embodiment of the invention, at block 310 the second server converts each received ciphertext into a pair of encrypted secret shares of the underlying plaintext data element of which the ciphertext is an encryption. More specifically, the first secret share in each such pair is encrypted using the public key of the first server under a homomorphic cryptosystem, and the second secret share in the pair is encrypted using the public key of the second server under a homomorphic cryptosystem. The (unencrypted) secret shares in each pair together form a secret sharing of the underlying plaintext data element. In certain embodiments of the invention, the second server generates each such pair of encrypted secret shares using the homomorphic property of the cryptosystem. More specifically, the second server generates the first encrypted secret share in a pair by generating a random data element; encrypting that random data element using the public key of the first server; and using the homomorphic property of the cryptosystem to combine the encryption of the random data element with the ciphertext received from the first server to form a ciphertext that encrypts, under the public key of the first server, a masking of the underlying plaintext data element by the random data element. The second server then forms the second encrypted secret share in the pair by encrypting the inverse of the random data element using the public key of the second server. It should be noted that the term "masking" as used in this paragraph refers to the composition of two data elements using a group operation, and the inverse of the random data element is defined with respect to this group operation.

In an embodiment of the invention, at block 312 the second server generates a list consisting of the pairs of encrypted secret shares of underlying plaintext data elements, sorted according to the original sorted order of the underlying plaintext data elements. In the subsequent description of FIG. 3, this list will be referred to as the "first list" of pairs of encrypted secret shares.

In an embodiment of the invention, at block 314 the second server generates a second list of pairs of encrypted secret shares of dummy data elements. More specifically, the second server generates secret sharings of m dummy data elements, where m is the padding parameter described above in the description of block 304, and generates each pair in the second list of pairs of encrypted secret shares by encrypting the first secret share of each dummy data element using the public key of the first server, and encrypting the second secret share of each dummy data element using the public key of the second server. As explained in the description of FIG. 2, the terminology of "dummy" data elements is used to contrast such data elements from the data elements of the first server's sorted input list, which are referred to as the first server's "real" data elements. The dummy data element underlying the first pair in the second list of pairs of encrypted secret shares generated at block 314 is equal in value to the last real data element of the first server's sorted input list; this dummy data element will be referred to in the subsequent description of FIG. 3 as the "end-of-list" element. In certain embodiments of the invention, the second server generates the first pair in the second list of pairs of encrypted secret shares, which is a pair of encrypted secret shares of the end-of-list element, using the process described in the description of block 310 for generating pairs of encrypted secret shares of real data elements. More specifically, in a particular embodiment of the invention, to generate the first encrypted secret share in this pair, the second server generates a random data element; encrypts the random data element using the public key of the first server; and combines, using the homomorphic property of the cryptosystem, the resulting ciphertext with the ciphertext encrypting the last data element in the first server's sorted input list. To generate the second encrypted secret share in this pair, the second server encrypts the inverse of the random data element using the public key of the second server.

In an embodiment of the invention, at block 316 the second server applies the random permutation stored at block 304 to the concatenation of the first and second lists of pairs of encrypted secret shares generated at blocks 312 and 314, respectively, and stores the resulting permuted list.

Figure 4:
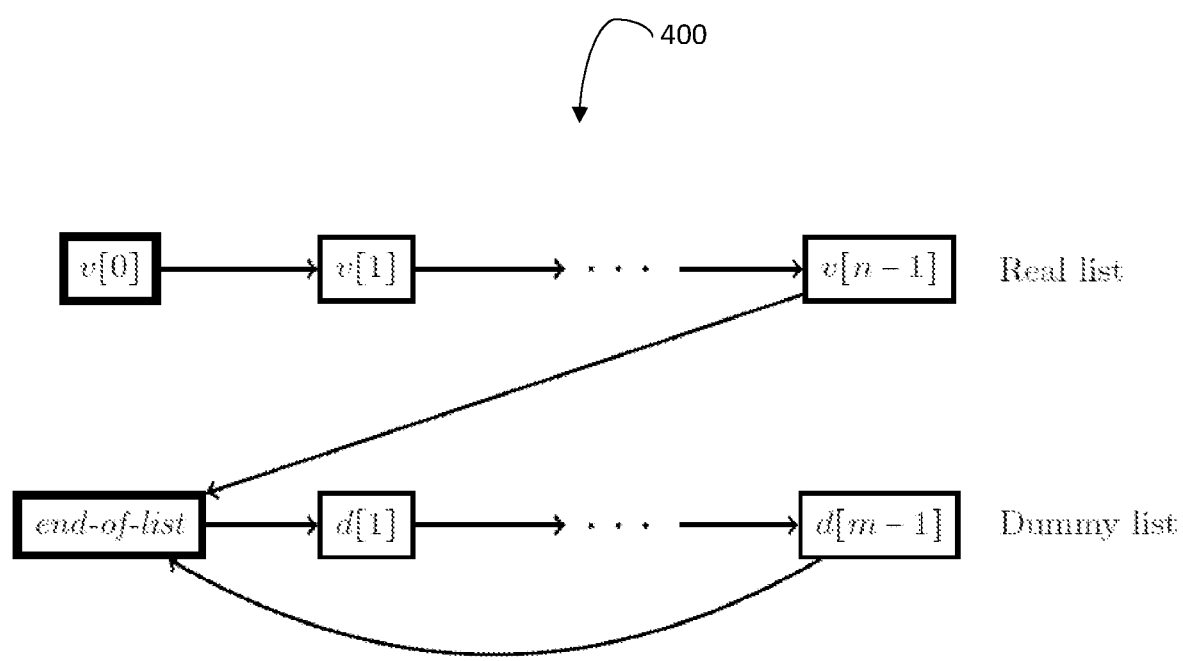
FIG. 4 illustrates the order in which data elements are accessed as an encrypted, permuted list traversed with a linked list of pointers, according to an embodiment of the present invention.

In an embodiment of the invention, at block 318 the second server generates a linked list of pointers, which encodes the random permutation applied at block 316. More specifically, the linked list has the same length m+n as the permuted list generated and stored at block 316. Each location j in the linked list stores a pointer that indicates the location in the permuted list that holds the next pair, with respect to the original ordering of the concatenation formed at block 316 before permutation, following the pair stored at location j in the permuted list, if any. The location in the linked list corresponding to the location in the permuted list that holds the last pair of encrypted secret shares, with respect to the original ordering of the concatenation, stores a pointer that indicates the location in the permuted list of the pair of encrypted secret shares of the end-of-list element. It will be appreciated that, beginning at the location in the permuted list that stores the pair of encrypted secret shares corresponding to the first real data element from the first server's sorted input list, accessing locations in the permuted list by successively following the pointers stored at corresponding locations in the linked list results in traversing the pairs in the permuted list in accordance with the following ordering of the underlying plaintext data elements: First, the real data elements from the first server's sorted input list are traversed in their original sorted order; then the dummy data elements are traversed in accordance with the original (unsorted) order of the list generated at block 314, beginning with the end-of-list element; and, after the final dummy data element is reached, the traversal returns to the end-of-list element. FIG. 4 is a flow diagram that depicts this traversal process 400, indicating the underlying plaintext real and dummy data elements corresponding to pairs of encrypted secret shares at accessed locations in the permuted list as the permuted list is traversed according to the pointers in the linked list.

In an embodiment of the invention, at block 320 the second server encrypts each pointer in the linked list to form an encrypted linked list. More specifically, the second server encrypts each pointer using the public key of the second server.

In an embodiment of the invention, at block 322 the second server generates a secret sharing of a head pointer pair for the linked list. More specifically, the first element of this head pointer pair is a pointer that indicates the location in the permuted list generated at block 316 that stores the pair of encrypted secret shares of the first real data element in the first server's sorted input list. The second element of this head pointer pair is a pointer that indicates the location in the permuted list that stores the pair of encrypted secret shares of the first dummy data element in the list generated at block 314, which is the pair of encrypted secret shares of the end-of-list element.

In an embodiment of the invention, at block 324 the second server sends to the first server the permuted list generated at block 316, the encrypted linked list generated at block 320, and the first server's secret share of the secret shared head pointer pair generated at block 322.

In an embodiment of the invention, at block 326 the first server converts each pair of encrypted secret shares of a plaintext data element in the permuted list it receives into a single ciphertext encrypting the same underlying plaintext data element under the public key of the second server, to form a list of ciphertexts. More specifically, to convert each pair of encrypted secret shares into a single ciphertext, the first server decrypts the first encrypted secret share in the pair, which is encrypted under the first server's public key, to obtain an unencrypted secret share of a plaintext data element. The first server next re-encrypts this unencrypted secret share using the public key of the second server to obtain a new ciphertext. The first server then uses the homomorphic property of the cryptosystem and the reconstruction protocol for the secret sharing to combine this new ciphertext with the second encrypted secret share in the pair, which is encrypted under the second server's public key, to obtain a single ciphertext encrypting the plaintext data element under the second server's public key.

It will be appreciated from the foregoing description of FIG. 3 that, in an embodiment of the invention, the protocol 300 leaks no information to the first server about the randomly generated permutation applied by the second server at block 316, and the protocol 300 leaks no information to the second server about the first server's sorted input list aside from its length.

FIG. 5 is a diagram of a protocol 500, according to an embodiment of the present invention, for two servers 102 and 104, one of which holds a ciphertext encrypting a plaintext data element under the public key of the other server for a homomorphic cryptosystem, to convert the ciphertext into a secret sharing of the plaintext data element without executing any secure multiparty computation protocol to evaluate a decryption circuit and without leaking to either server information about the plaintext data element. It should be noted that, in different applications in an embodiment of the invention, each server 102 and 104 may play the role of either the first server or the second server in the protocol 500 depicted in FIG. 5 and described below, as well as in the protocols 600 and 700 depicted in FIG. 6 and FIG. 7, as described below.

In an embodiment of the invention, as input to the protocol 500, at block 502 the first server holds a ciphertext that is an encryption of a plaintext data element under the public key of the second server.

In an embodiment of the invention, at block 504 the first server generates and stores a random data element. At block 506, the first server generates and stores a second ciphertext that is an encryption of a masking of the plaintext data element by the random data element generated at block 504. More specifically, the first server encrypts the random data element using the second server's public key. The first server then uses the homomorphic property of the cryptosystem to combine the resulting ciphertext with the original input ciphertext, yielding a ciphertext that is an encryption under the second server's public key of a masking of the plaintext data element by the random data element. It should be noted that, as used in the description of FIG. 5 and in the descriptions of FIG. 6 and FIG. 7 below, the term "masking" refers to the composition of two data elements using a group operation, and the inverse of a data element in such descriptions is defined with respect to this group operation.

In an embodiment of the invention, at block 508 the first server sends to the second server the ciphertext generated at block 506. At block 510, the second server uses its secret key to decrypt the received ciphertext and obtain the masking of the plaintext data element by the random data element.

At block 512, the servers use the random data element generated by the first server at block 504 and the masking of the plaintext data element obtained by the second server at block 510 to jointly generate a secret sharing of the plaintext data element without leaking information to the second server about the random data element, without leaking information to the first server about the unencrypted masking of the plaintext data element, and without leaking information to either server about the plaintext data element.

FIG. 6 is a diagram of a protocol 600 that specifies how the servers jointly generate a secret sharing of the plaintext data element at block 512 according to a particular embodiment of the invention. In this embodiment, the protocol 600 proceeds at blocks 602, 604, 606, 608, and 610 identically to the description above of protocol 500 in FIG. 5 at blocks 502, 504, 506, 508, and 510. At block 612, the second server generates a secret sharing of the masking of the plaintext data element obtained at block 610 and sends the first server's secret share of the masking to the first server. At block 614, the first server generates a secret sharing of the inverse of the random data element generated by the first server at block 604. At block 616, the first server computes its secret share of the plaintext data element using local computations on its secret share of the inverse of the random data element and its secret share of the masking of the plaintext data element. At block 618, the first server sends the second server's secret share of the inverse of the random data element to the second server. At block 620, the second server computes its secret share of the plaintext data element using local computations on its secret share of the inverse of the random data element and its secret share of the masking of the plaintext data element.

FIG. 7 is a flow sheet diagram of a protocol 700 that specifies how the servers jointly generate a secret sharing of the plaintext data element at block 512 according to another particular embodiment of the invention, where the secret sharing scheme is an additive secret sharing scheme. In this embodiment, the protocol 700 proceeds at blocks 702, 704, 706, 708, and 710 identically to the description above of protocol 500 in FIG. 5 at blocks 502, 504, 506, 508, and 510. At block 712, the second server stores the masking of the plaintext data element obtained at block 710 as the second server's secret share of the plaintext data element. At block 714, the first server computes the inverse of the random data element generated at block 704 and stores the inverse of the random data element as the first server's secret share of the plaintext data element.

The invention is more fully appreciated in connection with the following discussion of various embodiments thereof. One aspect of the present invention enables two servers, each storing a sorted list of data elements, to merge their two lists into a single, globally sorted list of secret sharings of the data elements through a protocol with asymptotic time, space, and communication complexity linear in the combined length of the lists, without leaking to either server any information about the other server's input list aside from its length. Embodiments of the invention enable the two servers to achieve such a merge of their input sorted lists securely in the presence of semi-honest adversaries and without requiring any computation by or communication with any other computing devices.

In order to achieve such a secure merge, from which neither server can receive or derive any information about the other server's original list aside from the number of data elements it contains, it should first be noted that such a secure merge cannot result in either server's receiving the merged list in the clear; indeed, such an outcome would allow the receiving server to determine every data element in the other server's list. Particularly in the context where the merged list will be used as an input to further secure computations performed by the two servers, a natural requirement of such a secure merge is that it provide a (2,2)-threshold secure secret sharing of the merged list between the two servers. That is, the secure merge should provide a list whose elements are such secret sharings of the corresponding elements in the merged list, and it should output to each server a list containing its respective secret shares of those elements.

It should further be noted that, in order to achieve a secure merge, it is insufficient simply to perform existing insecure protocols for merging sorted lists while additionally using secure multiparty computation comparison primitives applied to secret sharings of the data elements stored in the two lists. The reason for this insufficiency is that the advancing of a head pointer in an insecure merge protocol is not data-oblivious, as it reveals which server's list contains the smaller element at a given iteration. As an extreme example, a case may be considered in which the first server's head pointer is advanced at every iteration until the first server's original list is exhausted: in this scenario, each server will be able to derive that every data element of the first server's original list is smaller than every data element of the second server's original list.

In subsequent sections, it will be described how exemplary embodiments of the present invention overcome this insufficiency to provide, in a data-oblivious manner, a secret sharing of the merge of two secret sorted lists stored by two servers $S_0$ and $S_1$, which in an embodiment of the invention may be servers 102 and 104, respectively, as depicted in FIG. 1. It should be appreciated that achieving data-obliviousness requires hiding from both servers the access pattern of memory locations that can be associated with the position of a given data element in one of the two original sorted lists. In particular contexts, this in turn requires hiding from both servers two aspects of memory access: (1) which of the two original lists is being accessed, and (2) from which position in a given list a data element is being accessed.

One area of application of embodiments of the present invention is collaborative data processing and data analytics on private or sensitive data stored in multiple databases held by mutually untrusting parties. In such settings, the parties frequently desire to obtain the results of statistical or other aggregate computations on their pooled data, but collaboration is frequently impeded by a party's unwillingness or inability to reveal information about its own database to the other parties. This leads to a need for secure analytics frameworks that enable such parties to obtain results of computations on their joint data without leaking unacceptable information about their own databases to each other. Because merging of sorted lists is a ubiquitous operation in data processing and data analytics, a crucial component of such a secure analytics framework is a secure merge solution that allows two sorted lists stored by two mutually untrusting parties to be merged in globally sorted order, without leaking to either party any unacceptable information about the other party's list.

A particular application of secure merging according to embodiments of the invention is to secure joins of two databases. Because such join operations involve computing intersections of the databases' lists of join keys, a natural approach to implementing secure joins is to use the secure multiparty computation technique of private set intersection (PSI). There has been significant recent interest in PSI-based secure joins in industry, particularly due to the need for privacy-preserving data analytics solutions. In practice, to obtain such solutions that perform effectively at scale for privacy-preserving collaborative analytics on large databases, it is essential to have efficient PSI protocols. Although many efficient PSI protocols exist, most unfortunately simply output the intersection to at least one party in the clear. In secure analytics applications, this is undesirable; the PSI and secure join are typically only intermediate steps in a larger computation whose ultimate result is desired by the parties; revealing the intersection of the join keys is unacceptable information leakage. Accordingly, it is desirable to obtain efficient PSI protocols that output secret sharings of the intersection of two lists rather than output the intersection itself in the clear.

A standard approach to such secret-shared PSI is the Sort-Compare-Shuffle paradigm, under which a secure merge can be used to effect secret-shared PSI. Using a secure merge protocol according to embodiments of the present invention in this paradigm can yield highly efficient linear-time and linear-communication PSI protocols, which in turn yields highly efficient secure database joins; more precisely, embodiments of the present invention can be used to implement PSI protocols with $O(n)$ asymptotic time complexity and $O(n)$ asymptotic communication complexity, where n is the combined number of records in the databases to be joined. Here and elsewhere in the description of embodiments of the present invention, the standard "big O" notation is used to describe asymptotic complexity; a variable quantity A is said to be $O(B)$ for some other variable quantity B, where A and B vary depending on a common parameter, if there exists some fixed constant C such that A is less than or equal to C*B for all values of the underlying parameter.

It is known to provide for secure merging of two lists with $O(n)$ asymptotic time and communication complexity. However, such prior art requires computation by and communication between three servers and a trusted client computer in order to achieve such a secure merge of two lists. Particularly in applications to collaborative data processing and data analytics between two mutually untrusting parties, requiring an additional third server and an independent trusted client computer can create practical inefficiencies and obstacles to implementation. Accordingly, a crucial advantage of embodiments of the present invention is the ability to efficiently and securely merge two lists, each held at one of two servers, through a protocol involving only local computations at each of the two servers and communication between the two servers, without requiring any communication with or computation by any other computing devices.

It should further be noted that embodiments of the present invention can be applied in the context of asymmetric merging, where one server holds a small sorted list and the other server holds a large sorted list. In this context, the large sorted list is assumed to contain more data elements than can be stored in memory for processing by either server; for example, the large sorted list may be stored in a distributed manner across multiple storage devices but may be too large to fit in the random access memory accessible to the processor of either server. By contrast, the small sorted list is assumed to fit in a fixed proportion of the memory accessible for processing to each server. The large sorted list and the smaller sorted list can be merged without leaking information to either server about the list held by the other server, by dividing the larger sorted list into sufficiently small contiguous chunks each containing a number m of data elements and forming the secure merge, according to an embodiment of the present invention, of the first chunk (in sorted order) and the smaller list, separately storing the first m (secret shared) data elements in the resulting merge, and replacing the small list in memory with the remaining data elements in the merge. This procedure is repeated iteratively with successive chunks of the larger list and the replacement of the smaller list formed at the previous iteration, until it has been applied to all chunks of the larger list. Such asymmetric applications of embodiments of the present invention are particularly useful for providing efficient secure merging in collaborative "big data" processing and analytics contexts where one party to a collaboration holds private or sensitive data at a large scale.

Certain embodiments of the present invention make use of several cryptographic primitives. The notation $S_i$, where $i \in \{0,1\}$, denotes a server 102 or 104 as shown in FIG. 1, and all subscripts are considered to be modulo 2. Thus, if $S_i$ is one of the servers 102 or 104, then $S_{i+1}$ is the other server.

Certain protocols executed in exemplary embodiments of the invention will be executed at least once for each of the two servers $S_0$ and $S_1$; in subsequent descriptions of exemplary embodiments of the invention, such protocols are denoted with an index i with respect to which the process steps are written.

Each data element stored in each of the servers' lists is considered to be representable as an element of a group G. For example, in certain embodiments of the invention, the group G may consist of bit strings of a prescribed length, with bitwise XOR as the group operation; however, in general, G may be another group. Because the lists are to be sorted, the group G is understood to be equipped with an underlying ordering. It should be noted that, in embodiments of the invention, the group G may vary from data element to data element, and even for a single given data element the group G may vary depending on the particular cryptographic primitive being applied to the data element (for example, secret sharing or homomorphic encryption). To simplify exposition, however, descriptions of embodiments of the invention will refer simply to a single group G. Unless specifically noted or otherwise clear from context, even though the group G is not necessarily assumed to be abelian, the symbols + and − will be interpreted with respect to the group operation of G and inversion of group elements in G.

Certain embodiments of the present invention make use of a (2,2)-threshold secure secret sharing scheme, where for a secret $x \in G$, $[\![ x ]\!] = ([\![ x ]\!]_0, [\![ x ]\!]_1)$ denotes a secret sharing of the plaintext x, with $[\![ x ]\!]_i$ the share belonging to server $S_i$. The only property required of the secret sharing scheme by embodiments of the present invention is that, given $[\![ x ]\!]$ and $[\![ y ]\!]$, the servers $S_i$ can compute $[\![ x+y ]\!]$ with no communication. That is, server $S_0$ can compute $[\![ x+y ]\!]_0$ using only local computations at server $S_0$ involving $[\![ x ]\!]_0$ and $[\![ y ]\!]_0$, and server $S_i$ can compute $[\![ x+y ]\!]_j$ using only local computations at server $S_i$ involving $[\![ x ]\!]_1$ and $[\![ y ]\!]_1$. For example, in certain embodiments, the scheme may be an additive secret sharing scheme, under which a secret x is shared as $[\![ x ]\!] = (x-r, r)$ for $r \leftarrow G$ a random element. In other embodiments, the scheme may be a linear secret sharing scheme. Certain embodiments of the invention may make use of multiple such secret sharing schemes. Such secret sharing will also be applied to individual bits, which may be viewed as elements of the group {0,1} with addition modulo 2; for clarity of exposition, the same notations are used for secret sharings of bits as for secret sharings of data elements in a potentially different group G.

Unless otherwise specified, a statement that a given server $S_i$ "secret shares" a given data element x should be interpreted to mean that server $S_i$ generates a secret sharing $[\![ x ]\!] = ([\![ x ]\!]_0, [\![ x ]\!]_1)$ of x, retains its share $[\![ x ]\!]_i$ in memory, and transmits the other share $[\![ x ]\!]_{i+1}$ to server $S_{i+1}$.

Certain embodiments of the present invention further make use of three basic secure multiparty computation primitives for secure processing on secret shares by the servers $S_0$ and $S_i$: comparison, equality testing, and multiplexing. On input secret sharings of x and y, the comparison and equality testing primitives $[\![ x<y ]\!]$ and $[\![ x=y ]\!]$, respectively, each return a secret sharing of a bit corresponding to the Boolean truth value of the respective statement. On input secret sharings of a bit b and of data elements x and y, the multiplex primitive $mux([\![ b ]\!], [\![ x ]\!], [\![ y ]\!])$ returns a secret sharing of x if b=0 and a secret sharing of y if b=1.

These three primitives are implemented in most secure computation frameworks, including ABY, EMP, SCALE-MAMBA, and MPyC. It should be noted that the secure multiparty computation primitives for processing on secret sharings can each be achieved using O(1) operations with O(1) communication overhead using currently available implementations. The present invention is compatible with both arithmetic-circuit-based and Boolean-circuit-based secure computation protocols implementing these primitives; however, in certain embodiments, Boolean-circuit-based protocols will likely yield more efficient comparison and equality testing.

The subsequent description of exemplary embodiments of the invention will also refer to a protocol $Reveal_i$, for i=0 or i=1, which, on input a secret sharing $[\![ x ]\!]$ of a data element x, outputs to server $S_i$ the plaintext of the underlying data element x. In an embodiment of the invention, this protocol $Reveal_i$ proceeds by server $S_{i+1}$ sending its secret share $[\![ x ]\!]_{i+1}$ to server $S_i$, after which server $S_i$ computes x from the pair $([\![ x ]\!]_0, [\![ x ]\!]_1)$.

Certain embodiments of the present invention make use of a homomorphic public-key cryptosystem for encryption and decryption of data elements, which in exemplary embodiments described further below is assumed to be semantically secure. The homomorphism property of the cryptosystem assumed in descriptions of exemplary embodiments is as follows: the cryptosystem's message space is a group G; there is an algorithm Add which, on input a public key and ciphertexts encrypting group elements x and y, outputs a ciphertext encrypting x+y; and, for each x and y, the distribution of ciphertexts of x+y so generated using Add is computationally indistinguishable from the distribution of ciphertexts obtained by directly encrypting x+y. For example, embodiments of the present invention are compatible with classical additively homomorphic cryptosystems such as the Paillier cryptosystem, as well as lattice-based schemes that work natively over the integers modulo 2, such as the BFV scheme or CGGI scheme, both of which are supported by existing implementations of fully homomorphic encryption. It is to be noted that, although the symbol + is used here, as explained earlier the group operation with respect to which the cryptosystem is homomorphic need not be literal addition; for example, the present invention is also compatible with multiplicative ElGamal encryption.

In certain embodiments of the invention, each server $S_i$ stores a secret key $sk_i$ for decryption and has a public key $pk_i$, which is available both to server $S_i$ and to server $S_{i+1}$, for encryption under such a homomorphic cryptosystem. The encryption of a data element x under the public key of server $S_i$ will be denoted by $\langle\!\langle x \rangle\!\rangle_i$. In some embodiments of the present invention the same such cryptosystem will be used by each of the two servers; however, it is to be appreciated that each server may make use of a different cryptosystem, as long as each satisfies the homomorphism property described above.

A key advantage of one aspect of the present invention is that it provides secure merging of lists stored by two servers with communication linear in the combined length of the lists. It should be noted that to achieve this linear communication performance, the homomorphic cryptosystem used in an embodiment of the invention should have constant ciphertext expansion, although this is not necessary in all embodiments of the invention.

Unless otherwise specified, a statement that a server "encrypts" a given list should be interpreted to mean that the server encrypts the list element-by-element; that is, the server encrypts each data element contained in the list to generate another list, referred to as an "encrypted list," whose elements are the resulting ciphertexts, where the position of a given ciphertext in the encrypted list is the same as the position in the original list of the data element of which it is an encryption.

Attention turns to an efficient secure merging of sorted data lists held by two servers according to an exemplary embodiment of the present invention; subsequent discussions will describe in greater detail how such secure merging can be achieved according to particular exemplary embodiments of the invention. To assist in understanding, the two key challenges for preserving security introduced above should be recalled in relevant contexts: Challenge 1: Neither server should be able to determine which of the two servers' lists is being accessed. Challenge 2: Neither server should be able to determine which location in a given list is being accessed.

It should be noted that existing two-party protocols for oblivious shuffling are inadequate to address these challenges; although such protocols can be used to achieve an oblivious permutation of each server's list, they do not provide a mechanism for traversing the shuffled lists in accordance with the original ordering of each server's list. Embodiments of the present invention address these challenges, as well as additional challenges presented by requiring computation by and communication between only the two servers that hold the original secret sorted lists, using three main constructions, which are described in the remainder of this section: (1) padding the original lists with dummy data elements, obliviously shuffling the padded lists, and generating associated linked lists to be used in traversing the shuffled padded lists in a manner compatible with the ordering of the original sorted lists; (2) comparing encryptions of appropriate real, i.e., non-dummy, data elements from the padded and shuffled lists; and (3) for each server's linked list, obliviously advancing a head pointer associated to either real or dummy data elements, as determined by the result of the comparison of encrypted real data elements.

In an embodiment of the invention, the goal of this construction is for each server $S_i$ to achieve an encrypted permutation of its own list, as permuted by and encrypted under the public key of the other server $S_{i+1}$, as well as a linked list that will be used to traverse the permuted list according to the sorted order of the original list. That is, within this construction, server $S_{i+1}$ will act as a permuting server for server $S_i$, generating both a permutation of server $S_i$'s original list and an associated linked list to traverse the permuted list. For ease of understanding, this permuted list and associated linked list are described as separate lists; however, it should be appreciated that, in certain embodiments of the invention, these two lists may be stored and/or transmitted over a communication channel using a single data structure.

In order to preserve security of the underlying data, it is desirable that server $S_{i+1}$ not be able to derive any information about the value of any data element of server $S_i$'s original list. To ensure this security, in an embodiment of the invention, server $S_i$ will encrypt each data element stored in its list using its public key $pk_i$ before sending the list of encrypted data elements, in the original sorted order, to server $S_{i+1}$ for permutation.

It should further be noted that, in order to ensure obliviousness with respect to memory access patterns, and specifically to address Challenges 1 and 2 noted above, it is desirable both that server $S_i$ not be able to derive any information about the permutation applied to its encrypted list by server $S_{i+1}$, as well as that neither server be able to derive which list is being accessed following subsequent comparisons of secret sharings. It is also desirable that server $S_{i+1}$ not be able to derive, using the permutation, the locations in the original sorted order of server $S_i$'s list corresponding to data elements accessed during such comparisons.

Toward achieving such desired obliviousness, in an embodiment of the invention, server $S_{i+1}$ generates a list comprising encrypted secret sharings of the real data elements in server $S_i$'s list concatenated with a list of encrypted secret sharings of dummy data elements, wherein, for each secret sharing, server $S_i$'s share is encrypted with server $S_i$'s public key $pk_i$ and server $S_{i+1}$'s share is encrypted with server $S_{i+1}$'s public key $pk_{i+1}$. Server $S_{i+1}$ generates a random permutation $\pi$ and applies it to this concatenated list of encrypted secret sharings of real and dummy data elements. It should further be noted that, by using the homomorphic property of the cryptosystem as previously described, server $S_{i+1}$ can efficiently generate such encrypted secret sharings of the real data elements from server $S_i$'s list even though server $S_{i+1}$ has access only to encryptions of those data elements under $S_i$'s public key. The permuted list of encrypted secret sharings generated by server $S_{i+1}$ as described in this paragraph will be denoted by $c_i^\pi$.

In an embodiment of the invention, server $S_{i+1}$ uses the permutation $\pi$ to generate a linked list of pointers that encodes, for locations in the permuted list, which location in the permuted list corresponds to the next data element when the real and dummy data elements underlying the list are traversed according to the original order of the concatenated list prior to permutation; in certain embodiments of the invention, the linked list will further point the location in the permuted list corresponding to the last dummy element to the location in the permuted list corresponding to the first dummy element. Server $S_{i+1}$ encrypts each element of this linked list using its own public key $pk_{i+1}$. The encrypted linked list generated by server $S_{i+1}$ as described in this paragraph will be denoted by $t_i$.

In an embodiment of the invention, server $S_{i+1}$ secret shares a head pointer pair, which contains pointers to the locations in the permuted list corresponding to the first element of $S_i$'s list of real data elements (referred to as server $S_i$'s real list) and first element of the list of dummy data elements (referred to as server $S_i$'s dummy list) in their original orders. This head pointer pair will be denoted by $p_i$. Server $S_{i+1}$ further transmits to server $S_i$ the lists $c_i^\pi$ and $t_i$.

From the foregoing description, it will be appreciated that, in an embodiment of the invention, server $S_i$ receives: its secret share $[\![\, p_i\,]\!]_i$ of the head pointer pair $p_i$; the linked list $t_i$ of pointers encrypted under the public key $pk_{i+1}$ of server $S_{i+1}$; and the permuted list $c_i^\pi$ of encrypted secret sharings of real and dummy data elements. With respect to $c_i^\pi$, it should be noted that, for each such real or dummy data element, server $S_i$ receives encryptions of both its secret share and server $S_{i+1}$'s secret share of the data element, with each share encrypted under the respective server's public key.

In an embodiment of the invention, server $S_i$ recombines each element of the list $c_i^\pi$, which is an encrypted secret sharing of the form $(\langle\!\langle\, [\![\, x\,]\!]_0\,\rangle\!\rangle_0, \langle\!\langle\, [\![\, x\,]\!]_1\,\rangle\!\rangle_1)$ for some real or dummy data element x, into a single encryption $\langle\!\langle\, x\,\rangle\!\rangle_{i+1}$ of the corresponding data element under the public key of server $S_{i+1}$. As a result, server $S_i$ achieves a permutation of its original list padded with dummy elements, together with a linked list of pointers and a secret-shared head pointer pair for traversing the permuted list in accordance with the original sorted order of $S_i$'s list. It will be appreciated that the permutation $\pi$ is oblivious from the perspective of server $S_i$ itself, as well as that each data element in the permuted list and each pointer in the linked list is encrypted under the public key $pk_{i+1}$ of the other server $S_{i+1}$.

In an embodiment of the invention, once the procedure described above has been performed by both servers, that is, both with i=0 and i=1, the servers can apply secure multi-party computation primitives for processing on secret shares to the secret sharings $[\![p_0]\!]$ and $[\![p_1]\!]$ of the head pointer pairs to output to each server the ciphertext of the first real data element of its list according to its original sorted order, where the ciphertext is encrypted under the public key of the other server.

In order to effect any merging of the two lists, these two first real data elements must be compared to determine which is the smaller; as will be described further below, such comparisons will also need to be applied to additional pairs of real data elements as the lists are traversed. It should be noted that, because each server extracts a ciphertext of a data element from its own list encrypted under the other server's public key, comparing the values of the underlying data elements in order to identify the smaller one presents a significant challenge.

Using the comparison primitive described above, the two servers can securely effect such a comparison if the aforementioned ciphertexts can be converted to secret sharings of the underlying data elements. In theory, any general-purpose secure multiparty computation protocol could be used to convert ciphertexts to secret sharings without leaking information about the underlying data elements to either server, by evaluating the appropriate decryption circuit within the secure multiparty computation protocol. However, in practice, evaluating such a decryption circuit using a generally applicable secure multiparty computation protocol is extremely costly in terms of computational and communication complexity. Because one goal of an embodiment of the present invention is to provide secure merging of the two servers' lists with time and communication complexity linear in the combined length of the lists, and because in general every data element in those two lists may be involved in at least one comparison in any merge protocol (secure or not), it is desirable that the ciphertext-to-secret-sharing conversion be accomplished using O(1) operations with O(1) communication overhead between the two servers. To the current knowledge of the inventors, no currently existing general-purpose secure multiparty computation protocol can achieve such efficiency.

Embodiments of the present invention provide for efficiently converting ciphertexts to secret sharings in the two-server setting where each ciphertext is encrypted under a homomorphic cryptosystem, without requiring the servers to evaluate a decryption circuit under a general-purpose secure multiparty computation protocol. In an embodiment of the invention, if server $S_i$ holds an encryption $\langle\!\langle x \rangle\!\rangle_{i+1}$ of a plaintext data element x under the public key $pk_{i+1}$ of server $S_{i+1}$, server $S_i$ generates and stores a random data element r and uses the homomorphic property of the cryptosystem to generate a ciphertext that encrypts, again under $pk_{i+1}$, a masking of x by the random data element r. Server $S_i$ sends this ciphertext to server $S_{i+1}$, and server $S_{i+1}$ decrypts it to obtain the masking of x by r. The servers $S_i$ and $S_{i+1}$ then generate a secret sharing of the unmasked plaintext x, using a constant number of operations and a constant number of rounds of communication, without revealing to server $S_{i+1}$ the random mask r and without revealing to server $S_i$ the masking of x by r. More detailed descriptions of this ciphertext-to-secret-sharing conversion according to particular exemplary embodiments of the invention are discussed below.

It should be noted that the conversion of a ciphertext to a secret sharing described in the previous paragraph is secure; i.e., it leaks no information about the underlying plaintext data element x to either of the two servers. Moreover, it should be noted that this aspect of an embodiment of the present invention can be applied in many secure multiparty computation contexts beyond that of secure merging of lists, and it provides a significantly more efficient and therefore more practically effective alternative to evaluation of decryption circuits under general-purpose secure multiparty computation protocols.

In an embodiment of the invention, once each server has executed the disclosed ciphertext-to-secret-sharing conversion, the servers can jointly execute a secure multiparty computation comparison primitive to compare the first real data elements of the two servers' lists with respect to their original sorted orders and securely update a secret sharing of at least one special data element b that encodes which server's list contained the smaller element. It should be noted that, according to different embodiments of the invention, b may consist of a single bit, a pair of bits, or some larger data element. The two servers can then use this special data element b to store a secret sharing of the smaller real data element to the first location of a target list; it will be appreciated from the subsequent description that this target list will eventually yield a secret sharing of the merge of the two servers' lists according to their original sorted orders.

In an embodiment of the invention, the servers use the secret sharing of the special data element b to obliviously advance either the real or the dummy list for each server as appropriate; the real list of the server whose list contained the smaller first real data element will be advanced, while the dummy list of the other server will be advanced. In an embodiment of the invention, the appropriate list of each server $S_i$ is advanced by obliviously updating the head pointer in the head pointer pair $p_i$ for either the real or the dummy element, corresponding to whether the real or dummy list is to be advanced, to the next location obtained from the linked list $t_i$ of pointers. It should be noted that, as described above, in an embodiment of the invention the pointer for this next location is stored by server $S_i$ as a ciphertext encrypted under the public key $pk_{i+1}$ of server $S_{i+1}$; the two servers convert this ciphertext to a secret sharing of the pointer to generate the updated secret sharing of the head pointer pair $p_i$. It should further be noted that if a server's real list is advanced, then necessarily the other server's dummy list is advanced, and vice versa.

In an embodiment of the invention, the servers store a secret sharing of the real data element of each server's list most recently used in a comparison with a real data element from the other server's list; this real data element for server $S_i$ is referred to as server $S_1$'s current real data element.

In an embodiment of the invention, once the servers' respective lists have been advanced by obliviously updating the head pointers, the servers execute a secure comparison of encrypted real data elements. Instead of comparing the ciphertexts encrypting the first real data elements of the two servers' lists, however, the ciphertext of the real data element indicated by the updated head pointer for the server whose real list was advanced is compared with the ciphertext of the current real data element of the server whose dummy list was advanced. In an embodiment of the invention, the special data element b is updated to encode the result of the secure comparison as previously described, and a secret sharing of the smaller real data element is appended to the target list.

In an embodiment of the invention, the procedure of securely comparing encrypted real data elements, appending a secret sharing of the smaller real data element to the target list, and obliviously advancing the servers' lists is repeated iteratively. In an embodiment of the invention, the servers maintain a secret sharing of a data element fin that encodes whether either server's real list has been exhausted; that is, whether a secret sharing of every real data element in either server's list has been appended to the target list. To maximize efficiency, in preferred embodiments the data element fin will consist of a single bit. In an embodiment of the invention, once either server's real list has been exhausted, the servers use the secret sharing of the fin data element to obliviously access and append secret sharings of the remaining data elements from the other server's unexhausted real list to the target list.

It should be noted that at the end of this iterative procedure, the target list achieves a secret sharing of the merge of the servers' lists according to their original sorted orders, which is one goal of embodiments of the present invention. It should further be noted that, because the servers achieve comparisons of real data elements and updating of head pointer pairs through secure multiparty computation primitives applied to secret sharings, neither server can derive any information about the values of the underlying real data elements or about which server's list contains the smaller data element at any stage of the iteration. Moreover, it will be appreciated from the foregoing descriptions, as well as subsequent descriptions of particular exemplary embodiments, that embodiments of the present invention can achieve such a secure merge with space, time, and communication complexity each linear in the combined length of the servers' original lists.

This section describes in greater detail protocols used to achieve secure ciphertext-to-secret-sharing conversion of encrypted data elements and secure merging of lists according to particular exemplary embodiments of the present invention. For protocols referring to lists of data elements held by one of the two servers $S_0$ and $S_1$, $n_i$ will denote the length of the list held by server $S_i$, that is, the number of data elements in server $S_i$'s list. Additionally, n will be used to denote the combined length of the servers' lists; that is, $n=n_1+n_2$.

Below is a list of process steps in a protocol $EncToSS_i$ for converting a ciphertext of a secret plaintext data element x, encrypted using the public key of one of the two servers $S_0$ or $S_i$ under a homomorphic cryptosystem, into a secret sharing of x between the two servers, according to an exemplary embodiment of the present invention:

$EncToSS_i$: Convert Ciphertext to Secret Sharing

Input: Server $S_0$ holds ciphertext $\langle\!\langle x \rangle\!\rangle_1$ encrypted using $pk_1$.

Output: Returns secret sharing $\langle\!\langle x \rangle\!\rangle$ of underlying plaintext x.

1. $S_0$ generates random $r \leftarrow G$
2. $S_0$ encrypts $\langle\!\langle r \rangle\!\rangle_1$
3. $S_0$ computes $\langle\!\langle x+r \rangle\!\rangle_1$
4. $S_i$ sends ciphertext $\langle\!\langle x+r \rangle\!\rangle_{i+1}$ to $S_{i+1}$
5. $S_{i+1}$ decrypts ciphertext $\langle\!\langle x+r \rangle\!\rangle_{i+1}$ to obtain $x'=x+r$
6. $S_{i+1}$ secret shares x'
7. $S_i$ secret shares $-r$
8. $S_i$ computes $[\![ x ]\!]_i$ from $[\![ x' ]\!]_i$ and $[\![ -r ]\!]_i$
9. $S_{i+1}$ computes $[\![ x ]\!]_{i+1}$ from $[\![ x' ]\!]_{i+1}$ and $[\![ -r ]\!]_{i+1}$
10. return $[\![ x ]\!] = ([\![ x ]\!]_0, [\![ x ]\!]_1)$ Server $S_i$ inputs to the protocol a ciphertext $\langle\!\langle x \rangle\!\rangle_{i+1}$ encrypted under the public key $pk_{i+1}$ of the other server $S_{i+1}$. It should be noted that neither server is assumed to have access to any other information about the underlying plaintext x, and the protocol $EncToSS_i$ will output a secret sharing of x without revealing any information about x to either server.

To execute the protocol, server $S_i$ generates and stores a (uniformly) random element r of the group G and encrypts it under the public key of server $S_{i+1}$. Using the Add algorithm for the homomorphic encryption scheme, at Line 3 of protocol $EncToSS_i$, server $S_i$ uses the public key $pk_{i+1}$ of server $S_{i+1}$ to compute the ciphertext $\langle\!\langle x+r \rangle\!\rangle_{i+1} = Add(\langle\!\langle x \rangle\!\rangle_{i+1}, \langle\!\langle r \rangle\!\rangle_{i+1})$. Server $S_i$ sends this ciphertext to server $S_{i+1}$, which decrypts the ciphertext using its secret key $sk_{i+1}$ to obtain $x'=x+r$, a masking of the plaintext x by the random element r. It should be noted that the distribution of maskings x' so obtained by server $S_{i+1}$ under the protocol is computationally indistinguishable from a uniform distribution on the elements of G, so that server $S_{i+1}$ can derive no information about the underlying plaintext x, nor can it derive any information about the random mask r. At Line 6 of protocol $EncToSS_i$, server $S_{i+1}$ generates a secret sharing of the masking x', stores its secret share $[\![ x' ]\!]_{i+1}$, and sends to server $S_i$ the other secret share $[\![ x' ]\!]_i$. At Line 7 of protocol $EncToSS_i$, server $S_i$ generates a secret sharing of $-r$ (the inverse group element of r), stores its secret share $[\![ -r ]\!]_i$, and sends to server $S_{i+1}$ the other secret share $[\![ -r ]\!]_{i+1}$. From these secret sharings of x' and $-r$, at Lines 8 and 9 of protocol $EncToSS_i$, the servers each locally compute, with no communication, their respective secret shares of $x=x'+(-r)$, resulting in the output secret sharing of x.

In another embodiment of the invention, where the secret sharing scheme is an additive secret sharing scheme, the following is a list of process steps for a more efficient protocol $EncToAddSS_i$ for converting ciphertexts to secret sharings:

$EncToAddSS_i$: Convert Ciphertext to Additive Secret Sharing

Input: Server $S_i$ holds ciphertext $\langle\!\langle x \rangle\!\rangle_{i+1}$ encrypted using $pk_{i+1}$.

Output: Returns additive secret sharing $[\![ x ]\!]$ of underlying plaintext x.

1. $S_i$ generates random $r \leftarrow G$
2. $S_i$ encrypts $\langle\!\langle r \rangle\!\rangle_{i+1}$
3. $S_i$ computes $\langle\!\langle x+r \rangle\!\rangle_{i+1}$
4. $S_i$ sends ciphertext $\langle\!\langle x+r \rangle\!\rangle_{i+1}$ to $S_{i+1}$
5. $S_{i+1}$ decrypts ciphertext $\langle\!\langle x+r \rangle\!\rangle_{i+1}$ to obtain $x'=x+r$
6. $S_{i+1}$ sets $[\![ x ]\!]_{i+1} = x'$
7. $S_i$ sets $[\![ x ]\!]_i = -r$
8. return $[\![ x ]\!] = ([\![ x ]\!]_0, [\![ x ]\!]_1)$ In the setting of an additive secret sharing scheme, the secret sharings at Lines 6 and 7 of protocol $EncToSS_i$ can be bypassed; because $(-r)+x'=x$, server $S_i$ can compute its secret share $[\![ x ]\!]_1$ as $-r$, and server $S_{i+1}$ can simply use x' as its secret share $[\![ x ]\!]_{i+1}$.

Below is a list of process steps, according to an exemplary embodiment of the invention, in a protocol $ShuffleLL_i$ for server $S_i$ to achieve a random permutation, oblivious from the perspective of server $S_i$ itself, of its input sorted list padded with dummy data elements, together with a linked list of pointers that can be used to traverse the permuted list in accordance with the original sorted ordering of the real data elements from server $S_i$'s input list. The data elements in both the permuted list and the linked list so achieved are encrypted using the public key of server $S_{i+1}$. The protocol $ShuffleLL_i$ also outputs to the servers a secret sharing of a head pointer, which is a pair of pointers identifying the permuted locations of the first dummy and first real data element of the padding of server $S_i$'s input list, according to its original unpermuted order:

ShuffleLL$_i$: Pad and Obliviously Permute List and Generate Linked List

Input: Server $S_i$ holds sorted list v of size $n_i$. Server $S_{i+1}$ holds random permutation $\pi$: $[n_i+m] \to [n_i+m]$ for some padding parameter $m>0$.

Output: Server $S_i$ receives (1) a permutation (under $\pi$, obliviously to $S_i$) of the list v padded with m dummy data elements and (2) a linked list of pointers for traversing the permuted list in accordance with the original sorted order of v. All data elements in both lists are encrypted using the public key of server $S_{i+1}$.

1. For $k \in \{0, \ldots, n_i-1\}$, server $S_i$ generates ciphertext $c[k] \leftarrow \langle\!\langle v[k] \rangle\!\rangle_i$ and sends encrypted list c to server $S_{i+1}$.
2. For $k \in \{0, \ldots, n_i-1\}$, server $S_{i+1}$ generates random $r_k \leftarrow G$ and sets $c_i[k] \leftarrow (c[k] - \langle\!\langle r_k \rangle\!\rangle_i, \langle\!\langle r_k \rangle\!\rangle_{i+1}$.
3. Server $S_{i+1}$ generates random $r \leftarrow G$ and sets $c_i'[0] \leftarrow (c[n_i-1] - \langle\!\langle r \rangle\!\rangle_i, \langle\!\langle r \rangle\!\rangle_{i+1})$
4. For $k \in \{1, \ldots, m-1\}$, server $S_{i+1}$ generates dummies $d[k]=d_0[k]+d_1[k]$, where $d_0[k], d_1[k] \leftarrow G$ are random, and sets $c_i'[k] \leftarrow (\langle\!\langle d_i[k] \rangle\!\rangle_i, \langle\!\langle d_{i+1}[k] \rangle\!\rangle_{i+1}$
5. For $j \in \{0, \ldots, n_i+m-1\}$, server $S_{i+1}$ sets $c_i^{\pi}[j] \leftarrow (c_i \| c_i')[\pi^{-1}(j)]$
6. Server $S_{i+1}$ creates linked list t' by setting, $t'[\pi(j)] \leftarrow \pi(j+1)$ for $j \in \{0, \ldots, n_i+m-2\}$ and $t'[\pi(n_i+m-1)] \leftarrow \pi(n_i)$
7. For $j \in \{0, \ldots, n_i+m-1\}$, server $S_{i+1}$ generates ciphertext $t_i[j] \leftarrow \langle\!\langle t'[j] \rangle\!\rangle_{i+1}$
8. Server $S_{i+1}$ secret shares $p_i=(\pi(n_i), \pi(0))$
9. Server $S_{i+1}$ sends permuted list $c_i^{\pi}$ and encrypted linked list $t_i$ to server $S_i$
10. Server $S_i$ computes encrypted, permuted, padded list $c^{\pi}$ by setting, for $j \in \{0, \ldots, n_i+m-1\}$, $c^{\pi}[j] \leftarrow \text{Add } (c_i^{\pi}[j][1], \langle\!\langle \text{Dec}(sk_i, c_i^{\pi}[j][0]) \rangle\!\rangle_{i+1})$ The protocol ShuffleLL$_i$ takes a padding parameter $m>0$, which determines the number of dummy data elements to be appended to server $S_i$'s list to effect the padding, that is, the length of the dummy list with which server $S_i$'s list will be concatenated. As inputs to the protocol, server $S_i$ holds a sorted list v containing $n_i$ data elements, and server $S_{i+1}$ holds a randomly generated permutation $\pi$ over $[n_i+m]$. It should be noted that server $S_{i+1}$ can generate such a random permutation in linear time, that is, with $O(n_i+m)$ operations, for example by using the Fisher-Yates algorithm.

To execute the protocol, server $S_i$ encrypts each data element of its input list v using its public key $pk_i$ and sends to server $S_{i+1}$ the list c of resulting ciphertexts (in sorted order of the underlying plaintext data elements). At Line 2 of protocol ShuffleLL$_i$, server $S_{i+1}$ generates $n_i$ random elements $r_k$ of the group G; encrypts each such random element twice, once using the public key of server $S_i$ and once using its own public key; and creates a list $c_i$ of pairs of ciphertexts of the form $c_i[k]=(\langle\!\langle v[k]-r_k \rangle\!\rangle_i, \langle\!\langle r_k \rangle\!\rangle_{i+1})$. To assist in understanding, with reference to Line 2 of protocol ShuffleLL$_i$, it should be noted that $c[k] - \langle\!\langle r_k \rangle\!\rangle_i = \langle\!\langle v[k]-r_k \rangle\!\rangle_i$ by definition of list c and by the homomorphism property of the cryptosystem. Accordingly, the list $c_i$ may be thought of as a list of secret sharings of the data elements of server $S_i$'s input list v in their original sorted order, but with each server's secret shares encrypted using its public key. To avoid confusion, it should further be noted that, although the terminology of "each server's secret shares" is used here, both of the encrypted secret shares for each data element are initially held by server $S_{i+1}$ and will eventually be sent to server $S_i$, at Line 9 of protocol ShuffleLL$_i$.

After generating this list of encrypted secret sharings of the real data elements of server $S_i$'s input list v, the protocol proceeds with server $S_{i+1}$'s generating a list $c_i'$ containing analogously constructed encrypted secret sharings of m dummy data elements, which will be concatenated with the list $c_i$ to effect the padding of server $S_i$'s input list. At Line 3 of protocol ShuffleLL$_i$, server $S_{i+1}$ generates and assigns to $c_i'[0]$ such an encrypted secret sharing of a special dummy data element referred to as the end-of-list element; instead of a randomly generated value, the end-of-list element stores the value of the largest real data element $v[n_i-1]$ from server $S_i$'s input list in sorted order. It should be noted that, although server $S_{i+1}$ does not have access to and cannot derive this underlying value $v[n_i-1]$, it can access and duplicate the ciphertext encrypting this underlying value under server $S_i$'s public key $pk_i$, which was sent to server $S_{i+1}$ as $c[n_i-1]$ (see Line 1 of protocol ShuffleLL$_i$). To set the remaining m-1 elements of $c_i'$, at Line 4 of protocol ShuffleLL$_i$, server $S_{i+1}$ generates secret sharings of m-1 randomly generated dummy data elements $d[1], \ldots, d[m-1]$; for each such secret sharing encrypts each server's secret share using the respective server's public key; and assigns to the remaining m-1 elements $c_i'[1], \ldots, c_i'[m-1]$ the resulting pairs of encrypted secret shares of the random dummy data elements. Server $S_{i+1}$ then computes the concatenation $c_i \| c_i'$, resulting in a list of $n_i+m$ ciphertext pairs, where the first $n_i$ pairs are encrypted secret sharings of the real data elements in server $S_i$'s input list in sorted order, the next pair is an encrypted secret sharing of the largest real data element duplicated as the end-of-list element, and the last m-1 pairs are encrypted secret sharings of random dummy data elements.

At Line 5 of protocol ShuffleLL$_i$, server $S_{i+1}$ permutes the padded list $c_i \| c_i'$, using its randomly generated permutation $\pi$, resulting in a shuffled padded list $c_i^{\pi}$. To provide for the eventual oblivious traversal of this permuted list in accordance with the original sorted order of server $S_i$'s input list, at Line 6 of protocol ShuffleLL$_i$, server $S_{i+1}$ generates a linked list t' of pointers, such that the pointer stored in location k of the linked list is the location k' such that $c_i^{\pi}[k']$ is the element that follows $c_i^{\pi}[k]$ in the unpermuted padded list $c_i \| c_i'$; that is, the pointer reveals which location in the permuted list corresponds to the next element according to the original, unpermuted ordering of the real and dummy data elements in the padded list. Additionally, for the location $\pi(n_i+m-1)$ in the permuted list corresponding to the last dummy data element, the pointer stored in the linked list is the location of the encrypted secret sharing of the end-of-list element in the permuted list $c_i^{\pi}$ (see Line 6 of protocol ShuffleLL$_i$). FIG. 4 depicts the order in which data elements are accessed when the permuted list $c_i^{\pi}$ (or the corresponding permuted list of ciphertexts $c^{\pi}$ described below in this section) is traversed according to the pointers in the linked list t'; it should be noted that, for ease of understanding, FIG. 4 depicts the underlying real and dummy data elements rather than the encrypted secret sharings thereof that are actually stored in the shuffled list $c_i^{\pi}$.

At Line 7 of protocol ShuffleLL$_i$, in order to hide the underlying permutation $\pi$ from server $S_i$, server $S_{i+1}$ encrypts each pointer of the linked list t' using its public key $pk_{i+1}$ to form an encrypted linked list t.

To facilitate the servers' obliviously advancing each of the lists of real and dummy data elements according to their original sorted order, at Line 8 of protocol ShuffleLL$_i$, server $S_{i+1}$ secret shares a head pointer pair $p_i$, which is a pair of pointers giving the permuted location $\pi(n_i)$ of the end-of-list element, which is the first dummy data element according to the original unpermuted order, and the permuted location $\pi(0)$ of the first real data element of server $S_i$'s input list according to the original sorted order.

At Line 9 of protocol ShuffleLL$_i$, server $S_{i+1}$ sends to server $S_i$ the shuffled list $c_i^\pi$ of encrypted secret sharings and the encrypted linked list t. At Line 10 of protocol ShuffleLL$_i$, server $S_i$ recombines each encrypted secret sharing from the shuffled list $c_i^\pi$, as follows: Server $S_i$ uses its secret key sk$_i$ to decrypt its secret share of the underlying real or dummy data element, and then re-encrypts this secret share using the public key pk$_{i+1}$ of the other server $S_{i+1}$. After this re-encryption, server $S_i$ holds encryptions of both its secret share and server $S_{i+1}$'s secret share of the underlying real or dummy data element, with both secret shares encrypted under server $S_{i+1}$'s public key. Using the Add algorithm of the homomorphic cryptosystem, server $S_i$ uses these ciphertexts to compute a single ciphertext that encrypts the underlying real or dummy data element under server $S_{i+1}$'s public key. Server $S_i$ then stores these recombined ciphertexts into a list $c^\pi$, which achieves a permutation of its original input list of real data elements padded with dummy elements.

It will be appreciated from the foregoing description of this section that, from the execution of protocol ShuffleLL$_i$, server $S_{i+1}$ can derive no information about any real data element of server $S_i$'s input list, and server $S_i$ can derive no information about the dummy data elements with which its input list was padded or the permutation under which its padded input list was shuffled.

Below is a list of process steps in a protocol Merge for securely achieving a secret sharing of the merge, in sorted order, of sorted input lists $n_0$ and $v_1$ held by servers $S_0$ and $S_i$ respectively, according to an exemplary embodiment of the present invention:

Merge: Securely Merge Sorted Lists
Input: Server $S_0$ holds input sorted list $v_0$ of length $n_0$.
Server $S_1$ holds input sorted list $v_1$ of length $n_1$.
Output: Servers obtain a secret sharing of the merge of their input lists in sorted order.
1. For $i \in \{0,1\}$, server $S_i$ locally generates random permutation $\pi_i$: $[n_0+n_1] \to [n_0+n_1]$
2. For $i \in \{0,1\}$, servers execute protocol ShuffleLL$_i$($v_i$, $\pi_{i+1}$), outputting secret sharing of head pointer pair $p_i$, and outputting to server $S_i$ ciphertext list $c_i$ and encrypted linked list $t_i$
3. For $i \in \{0,1\}$, ⟦$b_i$⟧ ← ⟦1⟧
4. For $i \in \{0,1\}$, ⟦cur$_i$⟧ ← ⟦⊥⟧
5. ⟦end⟧ ← ⟦$p_0[0]$⟧
6. ⟦fin⟧ ← ⟦0⟧
7. k ← 0
8. while k < $n_0+n_1$ do
9. For $i \in \{0,1\}$, ⟦pos$_i$⟧ ← mux(⟦$b_i$⟧, ⟦$p_i[0]$⟧, ⟦$p_i[1]$⟧)
10. ⟦fin⟧ ← ⟦fin⟧ ⊕ ⟦pos$_0$=end⟧
11. For $i \in \{0,1\}$, servers execute Reveal$_i$(⟦pos$_i$⟧)
12. For $i \in \{0,1\}$, ⟦temp$_i$⟧ ← EncToSS$_i$($c_i$[pos$_i$])
13. For $i \in \{0,1\}$, ⟦val$_i$⟧ ← mux(⟦$b_i$⟧, ⟦cur$_i$⟧, ⟦temp$_i$⟧)
14. ⟦$b_0$⟧ ← ⟦val$_0$ < val$_1$⟧ ⊕ ⟦fin⟧
15. ⟦$b_1$⟧ ← ⟦1−$b_0$⟧
16. ⟦l[k]⟧ ← mux(⟦$b_0$⟧, ⟦val$_1$⟧, ⟦val$_0$⟧)
17. For $i \in \{0,1\}$, ⟦cur$_i$⟧ ← ⟦val$_i$⟧
18. For $i \in \{0,1\}$, ⟦$p_i$⟧ ← UpdateHead$_i$(⟦$b_i$⟧, ⟦$p_i$⟧, $t_i$)
19. k ← k+1
20. end while
21. return (⟦l[0]⟧, ..., ⟦l[$n_0+n_1-1$]⟧)

To execute the protocol, at Lines 1 and 2 of protocol Merge the servers execute, both for i=0 and i=1, the protocol ShuffleLL$_i$ as described above, with input list $v_i$, padding parameter m=$n_{i+1}$, and a random permutation $\pi_{i+1}$:[n]→[n] generated by server $S_{i+1}$ (where n=$n_0+n_1$ is the combined length of the servers' two input lists). Each server $S_i$ thereby obtains an encrypted (under the public key of server $S_{i+1}$), shuffled version $c_i$ of its input list padded with dummy elements. Each server $S_i$ also obtains an encrypted (again under the public key pk$_{i+1}$) linked list $t_i$, which will later be used to traverse the shuffled list $c_i$ without leaking information about the accessed locations therein to server $S_{i+1}$; it should be noted that if server $S_{i+1}$ were able to derive accessed locations in the shuffled list $c_i$, it could in turn use the permutation $c_i+_1$ to derive the positions of accessed data elements with respect to the original sorted order of server $S_i$'s input list. Additionally, the servers obtain from the execution of ShuffleLL$_0$ and ShuffleLL$_1$ secret sharings of the head pointer pairs $p_0$ and $p_1$ associated to the encrypted, shuffled lists $c_0$ and $c_1$.

As will subsequently be described, the while loop at Lines 8-20 of protocol Merge depicts an iterative process, at each iteration of which the servers securely access data elements from the two shuffled lists, compare appropriate real data elements and append a secret sharing of the smaller such data element to a target list l, and appropriately update each server's head pointer pair in order to advance either the real or the dummy list for each server. At Lines 3-6 of protocol Merge, the servers initialize secret sharings of special data elements that will be maintained and updated in this iterative process, as follows.

At Line 3 of protocol Merge, the servers initialize a secret sharing of a bit $b_i$ for each server $S_i$; the bit $b_i$ will be equal to 1 at the beginning of iterations where a real data element is accessed from server $S_i$'s list, and $b_i$ will be equal to 0 at the beginning of iterations where a dummy data element is accessed from server $S_i$'s list, as can be seen from Lines 9, 11, and 12 of protocol Merge. Although both $b_0$ and $b_1$ are initialized to 1 at Line 3 of protocol Merge for the first iteration of the while loop, at every subsequent iteration the protocol will access a real data element from the list of exactly one of the servers, and the protocol will access a dummy data element from the other server's list. That is, at every iteration after the first, $b_1=1−b_0$, as shown at Line 15 of protocol Merge. Accordingly, because the value each of the bits $b_i$ is completely determined by the other server's bit $b_{i+1}$ at every iteration, it should be noticed that the protocol Merge can be optimized by maintaining a secret sharing of a single bit b in lieu of maintaining secret sharings of separate bits $b_0$ and $b_1$; however, the protocol is described using such separate bits in order to simplify the exposition.

To describe further how the protocol Merge accesses (secret sharings of) real and dummy data elements from the servers' lists, at Line 9 of protocol Merge the servers execute, for both i=0 and i=1, a secure multiparty computation multiplex primitive based on the secret shared bit $b_i$ to output a secret sharing of one of the two location pointers stored in server $S_i$'s head pointer pair $p_i$. If the bit $b_i$ is equal to 0, the primitive will output a secret sharing of the head pointer for server $S_i$'s dummy list, and if the bit $b_i$ is equal to 1, the primitive will output a secret sharing of the head pointer for server $S_i$'s real list. It should be recalled from the description of the protocol ShuffleLL$_i$ that, at the beginning of the first iteration of the while loop, these head pointers are the permuted locations of the first elements of server $S_i$'s dummy list and real list, respectively, according to their original sorted orders. It will further be described below how each head pointer pair is updated in each iteration of the while loop, and it should be noted that the secret shared pointer stored as a secret sharing pos$_i$ at Line 9 of protocol Merge is a location in server $S_i$'s shuffled list $c_i$ at which a ciphertext encrypting either a dummy (if $b_i=0$) or a real (if $b_i=1$) data element is stored. At Line 11 of protocol Merge, this secret shared location pointer is revealed to server $S_i$, for i=0 and i=1. At Line 12 of protocol Merge, each server $S_i$ uses its revealed pointer to access the ciphertext, encrypted using the public key of server $S_i+$, stored at that location of the permuted list $c_i$, and converts the ciphertext to a secret sharing of the underlying dummy or real data element using a protocol $EncToSS_i$.

At Line 4 of protocol Merge, for both i=0 and i=1, the servers initialize a secret sharing of a data element cure, which is the real data element from server $S_i$'s list most recently used in a comparison; $cur_i$ is referred to as server $S_i$'s current real data element and is initialized to a null pointer before the first iteration of the while loop. For a given server $S_i$, at any iteration k where a dummy data element is accessed from server $S_i$'s list (which implies that $b_i=0$ at the beginning of the iteration), it should be appreciated from Lines 14, 16, and 17 of protocol Merge that in the previous iteration k−1 the secret sharing of $cur_i$ was not appended to the target list l. That is, $cur_i$ is the smallest real data element of server $S_i$'s list, with respect to its original sorted order, that has not yet been added to the target list. Accordingly, after the dummy data element from server $S_i$'s list is accessed in iteration k of the loop (at Line 12 of protocol Merge), a secure multiparty computation multiplex primitive based on the bit $b_i=0$ is used at Line 13 of protocol Merge to replace this dummy data element with the real data element $cur_i$ to be compared with the appropriate real data element of server $S_{i+1}$'s list at Line 14 of protocol Merge.

To achieve this comparison, at Lines 14 and 15 of protocol Merge, the servers use a secure multiparty computation comparison primitive to compare the smallest real data elements of the servers' respective lists that have not yet been added to the target list, and update the secret sharings of the bits $b_i$, where $b_0$ is set to 1 if and only if server $S_0$'s data element is smaller than server $S_1$'s, and $b_1$ is set to $1-b_0$. The secret shared bit fin appearing at Line 14 of protocol Merge will be described further below in the context of iterations of the loop where all real data elements from one server's list have been appended to the target list; at present, it should be noted that fin=0 as long as neither server's real list has been so exhausted. At Line 16 of protocol Merge, a secret sharing of the smaller data element (or of server $S_1$'s data element if the two data elements are equal in value) is appended to the target list l.

After achieving the comparison, at Line 18 of protocol Merge the servers use a protocol $UpdateHead_i$ for i=0 and i=1 to update each server's head pointer pair $p_i$ to advance one server's real list and the other server's dummy list according to the encrypted pointers in the linked lists $t_0$ and $t_1$; the real list of the server whose real data element was appended to the target list at Line 16 of protocol Merge will be advanced, and the dummy list of the other server will be advanced. Below is a list of process steps for the protocol $UpdateHead_i$ according to an exemplary embodiment of the invention:

$UpdateHead_i$: Update Head Pointers of Linked Lists
Input: Secret sharing ⟦ b ⟧ of bit b; secret sharing ⟦ p ⟧ of head pointer pair p. Server $S_i$ holds linked list t of pointers encrypted under public key of server $S_{i+1}$.
Output: Head pointer pair updated with the next real or dummy position from t according to bit b.

1. ⟦ pos ⟧ ←mux(⟦ b ⟧ , ⟦ p[0] ⟧ , ⟦ p[1] ⟧ )
2. Servers execute $Reveal_i$ (⟦ pos ⟧ )
3. ⟦ next ⟧ ←$EncToSS_i$(t[pos])
4. ⟦ $p_{new}$[1] ⟧ ←mux(⟦ b ⟧ , ⟦ p[1] ⟧ , ⟦ next ⟧ )
5. ⟦ $p_{new}$[0] ⟧ ←mux(⟦ b ⟧ , ⟦ next ⟧ , ⟦ p[0] ⟧ )
6. return ⟦ $p_{new}$ ⟧

As applied at Line 18 of protocol Merge, the protocol $UpdateHead_i$ takes as input the secret sharing of the bit $b_i$, the secret sharing of server SL's head pointer pair $p_i$, and the linked list of encrypted pointers $t_i$ held by server $S_i$. At Line 1 of protocol $UpdateHead_i$, the protocol outputs a secret sharing of one of the head pointers in the head pointer pair $p_i$; if $b_i=0$ this head pointer is the location of an encrypted dummy data element in the shuffled list $c_i$, and if $b_i=1$ this head pointer is the location of an encrypted real data element in the shuffled list $c_i$. At Lines 2 and 3 of protocol $UpdateHead_i$, the underlying head pointer is revealed to server $S_i$, which extracts the ciphertext of the pointer stored at that location of the linked list $t_i$ and converts the ciphertext to a secret sharing of the underlying pointer using protocol $EncToSS_i$ (or, alternatively, $EncToAddSS_i$). It should be noted that this pointer gives the location of the next encrypted dummy (if $b_i=0$) or real (if $b_i=1$) data element in the shuffled list $c_i$ when traversed according to the linked list $t_i$ (as depicted in FIG. 4). At Lines 4 and 5 of protocol $UpdateHead_i$, either the dummy (if $b_i=0$) or the real (if $b_i=1$) head pointer of the head pointer pair $p_i$ is updated to this next location, and the other head pointer in $p_i$ is unaltered.

It should be noted that the padding of each server's input list with dummy data elements underlying the protocols $ShuffleLL_0$ and $ShuffleLL_1$ ensures that each server's head pointer pair $p_i$ is updated exactly once per iteration of the while loop in protocol Merge, and, moreover, that the use of secret sharing in protocol Merge ensures that neither server can derive whether a given server's real or dummy list has been advanced when its head pointer pair is so updated. It can be proven that, in the execution of protocol Merge, each memory location in each of the shuffled ciphertext lists $c_0$ and $c_i$ is accessed exactly once. Accordingly, because neither server can detect the memory location accessed in the other server's shuffled ciphertext list at any iteration, and because neither server can derive the random permutation under which its input list is shuffled, the distribution of overall memory access patterns resulting from applications of the protocol Merge is independent of the underlying data; that is, the protocol Merge is data-oblivious.

At Lines 5 and 6 of protocol Merge, the servers initialize secret sharings of a pointer end and a bit fin. The pointer end is initialized to the head pointer in $p_0$ giving the location in the permuted ciphertext list $c_0$ of server $S_0$'s first dummy data element, as output by protocol $ShuffleLL_0$ at Line 2 of protocol Merge. It should be recalled from the description of the protocol $ShuffleLL_i$ above that the pointer end is the location in $c_0$ of the end-of-list element, which has value equal to that of the largest real data element from server $S_0$'s original input sorted list. The bit fin is initialized to 0 and, as will be described further below, functions as a flag that, at Line 10 of protocol Merge, is set to 1 at all iterations of the while loop after either of the servers has exhausted its real list, that is, after a secret sharing of the largest real data element from either server's list has been appended to the target list l. It can be proven that at the beginning every iteration of the loop before either server has exhausted its real list, the bit fin remains equal to 0, and that once fin is set to 1 as described below, it remains equal to 1 at all subsequent iterations.

If server $S_0$ exhausts its real list during some iteration k−1 of the while loop before server $S_i$ has exhausted its real list, then at the beginning of iteration k, the bit $b_0$ will have been set to 1, the bit $b_i$ will have been set to 0, and the head pointer in $p_0$ for server $S_0$'s real list will have been advanced during iteration k−1 to store end, the location in $c_0$ of the end-of-list element. Accordingly, at Lines 9 and 10 of protocol Merge, the secret shared bit fin, which was set to 0 at iterations prior to k, is set to 1 at iteration k, the first iteration after server $S_0$ exhausts its real list. At Line 13 of protocol Merge for iteration k, the secret shared data element $val_0$ is set to server $S_0$'s end-of-list element, which is equal in value to the largest real data element of server $S_0$'s input list, and the secret shared data element $val_i$ is set to server $S_i$'s current real data element. Thus, the comparison primitive appearing at Line 14 of protocol Merge for iteration k compares the same underlying values that were compared at iteration k−1, but the value of the secret shared bit $b_0$ is now switched to 0, as compared to the value 1 assigned at iteration k−1, because the bit fin has been switched to 1. Moreover, because $val_0$ is smaller than every remaining real value of server $S_i$'s list whose secret sharing has not yet been appended to the target list, at Line 14 of protocol Merge for every iteration after k, $val_0$ will be compared to a real data element from server $S_i$'s list and the bit $b_0$ will remain set to 0. Accordingly, every iteration from k until the end of the while loop will append a secret sharing of a real data element from server $S_i$'s list to the target list.

If, on the other hand, server $S_i$ exhausts its real list during some iteration k−1 of the while loop before server $S_0$ has exhausted its real list, then prior to iteration k there will have been $n_i$ iterations in which server $S_i$'s real list was advanced at Line 18 of protocol Merge. These are precisely the iterations prior to k in which server $S_0$'s dummy list will have been advanced. Because server $S_0$'s input list was padded with exactly $n_1$ dummy data elements, at Line 18 of protocol Merge for iteration k−1 the head pointer in $p_0$ for server $S_0$'s dummy list will have been advanced to store end, as shown in FIG. 4 and at Line 6 of protocol ShuffleLL$_i$. As server $S_0$'s dummy list was advanced in iteration k−1, at the beginning of iteration k the bit $b_0$ will be equal to 0, so at Lines 9 and 10 of protocol Merge the secret shared bit fin will be switched to 1. Analogously to the description of the previous paragraph, in every iteration from k until the end of the while loop, at Line 14 of protocol Merge the value of the server $S_1$'s end-of-list element will be compared to the value of a larger real data element from server $S_0$'s list, and the bit $b_0$ will be set to 1 because fin is equal to 1. Accordingly, every iteration from k until the end of the while loop will append a secret sharing of a real data element from server $S_0$'s list to the target list.

The following results on the efficiency and security properties can be proven for the protocols described according to exemplary embodiments of the invention. Security results are presented in the context of standard definitions of semantic security in the presence of a semi-honest adversary.

Theorem 1: Protocol Merge outputs a secret-shared, sorted list, using 8n executions of secure multiparty computation multiplex primitives, n executions of secure multiparty computation comparison primitives, n executions of secure multiparty computation equality testing primitives, and 13n local encryptions, where n is the sum of the lengths of the two servers' sorted input lists. Furthermore, protocol Merge runs in O(n) time and requires O(n) communication overhead between the two servers.

Theorem 2: Protocols EncToSS$_i$ and EncToAddSS$_i$ securely compute in the presence of a semi-honest adversary an ideal functionality that takes as input from server $S_i$ a ciphertext encrypting a plaintext x and outputs to each server $S_i$ and $S_{i+1}$ its share of a secret sharing of the plaintext x.

Theorem 3: Protocol Merge securely computes in the presence of a semi-honest adversary an ideal functionality that takes as input a sorted list from each server $S_0$ and $S_i$ and outputs to each server in sorted order its share of a secret sharing of each element of the sorted merge of the two input lists.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. Non-transitory computer readable storage mediums with instructions executed by processors to:
concatenate a first list at a first server with first dummy data elements to form a first concatenated list;
apply a first permutation to the first concatenated list to form a first permuted concatenated list;
encrypt the first permuted concatenated list to form a first encrypted, permuted list;
form a first encrypted linked list of pointers to locations in the first encrypted, permuted list, where the first encrypted linked list encodes the order of the first concatenated list;
concatenate a second list at a second server with second dummy data elements to form a second concatenated list;
apply a second permutation to the second concatenated list to form a second permuted concatenated list;
encrypt the second permuted concatenated list to form a second encrypted, permuted list;
form a second encrypted linked list of pointers to locations in the second encrypted, permuted list, where the second encrypted linked list encodes the order of the second concatenated list; and combine elements of the first encrypted, permuted list and elements of the second encrypted, permuted list into a merged, sorted list of secret sharings, where the first encrypted linked list, the second encrypted linked list, and the merged, sorted list of secret sharings are formed solely utilizing local computations at the first server, local computations at the second server and communications solely between the first server and the second server.

2. The non-transitory computer readable storage mediums of claim 1 wherein the merged, sorted list is formed utilizing secret shared head pointers to locations in the first encrypted, permuted list and the second encrypted, permuted list, and where the merged, sorted list of secret sharings has unencrypted data elements formed without executing a secure multiparty computation protocol to evaluate a decryption circuit.

3. The non-transitory computer readable storage mediums of claim 1 wherein the first encrypted, permuted list and the first encrypted linked list are encrypted using a second public key of the second server under a first homomorphic cryptosystem, and the second encrypted, permuted list and the second encrypted linked list are encrypted using a first public key of the first server under a second homomorphic cryptosystem.

4. The non-transitory computer readable storage mediums of claim 3 wherein the first list is converted into the first encrypted, permuted list utilizing instructions to convert the first list locally at the first server into a first encrypted list using the first public key of the first server under the second homomorphic cryptosystem, further comprising instructions executed by the processors to:
send the first encrypted list to the second server;
convert the first encrypted list locally at the second server into a first permuted list of pairs of encrypted secret shares with first pairs of encrypted secret shares of dummy data elements;
send the first permuted list of pairs of encrypted secret shares to the first server; and
convert the first permuted list of pairs of encrypted secret shares locally at the first server into the first encrypted, permuted list.

5. The non-transitory computer readable storage mediums of claim 4 wherein the second list is converted into the second encrypted, permuted list utilizing instructions to convert the second list locally at the second server into a second encrypted list using the second public key of the second server under the first homomorphic cryptosystem, further comprising instructions executed by the processors to:
send the second encrypted list to the first server;
convert the second encrypted list locally at the first server into a second permuted list of pairs of encrypted secret shares with second pairs of encrypted secret shares of dummy data elements;
send the second permuted list of pairs of encrypted secret shares to the second server; and
convert the second permuted list of pairs of encrypted secret shares locally at the second server into the second encrypted, permuted list.

6. The non-transitory computer readable storage mediums of claim 1 wherein the merged, sorted list is formed utilizing an additive secret sharing scheme.

7. The non-transitory computer readable storage mediums of claim 1 wherein the merged, sorted list is formed utilizing a linear secret sharing scheme.

8. The non-transitory computer readable storage mediums of claim 2 wherein the merged, sorted list is formed utilizing an additive secret sharing scheme.

9. The non-transitory computer readable storage mediums of claim 2 wherein the merged, sorted list is formed utilizing a linear secret sharing scheme.

10. The non-transitory computer readable storage mediums of claim 1 wherein the merged, sorted list is formed utilizing instructions to convert a first ciphertext encrypting a plaintext data element into a second ciphertext encrypting a masking of the plaintext data element by a random data element locally at the first server utilizing a homomorphic encryption property, further comprising instructions executed by the processors to:
transmit the second ciphertext to the second server;
decrypt the second ciphertext at the second server to obtain the masking of the plaintext data element; and
form a secret sharing of the plaintext data element utilizing local computations at the first server, local computations at the second server, and communications solely between the first server and the second server without revealing to the second server the random data element, and without revealing to the first server the masking of the plaintext data element.

11. The non-transitory computer readable storage mediums of claim 10 wherein the first ciphertext and the second ciphertext are encrypted under a second public key of the second server.

12. The non-transitory computer readable storage mediums of claim 11 wherein the instructions to form the secret sharing of the plaintext data element comprises secret sharing of the masking of the plaintext data element and secret sharing of an inverse of the random data element.

13. The non-transitory computer readable storage mediums of claim 11 wherein the instructions to form the secret sharing of the plaintext data element comprises storing an inverse of the random data element at the first server and storing the masking of the plaintext data element at the second server.

14. The non-transitory computer readable storage mediums of claim 2 wherein the merged, sorted list is formed utilizing instructions to convert a first ciphertext encrypting a plaintext data element into a second ciphertext encrypting a masking of the plaintext data element by a random data element locally at the first server utilizing a homomorphic encryption property, further comprising instructions executed by the processors to:
transmit the second ciphertext to the second server;
decrypt the second ciphertext at the second server to obtain the masking of the plaintext data element; and
form a secret sharing of the plaintext data element utilizing local computations at the first server, local computations at the second server, and communications solely between the first server and the second server without revealing to the second server the random data element, and without revealing to the first server the masking of the plaintext data element.

15. The non-transitory computer readable storage mediums of claim 14 wherein the first ciphertext and the second ciphertext are encrypted under a second public key of the second server.

16. The non-transitory computer readable storage mediums of claim 15 wherein the instructions to form the secret sharing of the plaintext data element comprises secret sharing of the masking of the plaintext data element and secret sharing of an inverse of the random data element.

17. The non-transitory computer readable storage mediums of claim 15 wherein the instructions to form the secret sharing of the plaintext data element comprises storing an inverse of the random data element at the first server and storing the masking of the plaintext data element at the second server.

* * * * *